(12) United States Patent
Kim et al.

(10) Patent No.: US 7,517,620 B2
(45) Date of Patent: Apr. 14, 2009

(54) METHOD FOR FABRICATING ARRAY SUBSTRATE HAVING COLOR FILTER ON THIN FILM TRANSISTOR STRUCTURE FOR LIQUID CRYSTAL DISPLAY DEVICE

(75) Inventors: Woong-Kwon Kim, Gunpo-shi (KR); Youn-Gyoung Chang, Uiwang-shi (KR)

(73) Assignee: LG Display Co., Ltd., Seoul (KR)

( * ) Notice: Subject to any disclaimer, the term of this patent is extended or adjusted under 35 U.S.C. 154(b) by 446 days.

(21) Appl. No.: 10/736,620

(22) Filed: Dec. 17, 2003

(65) Prior Publication Data

US 2004/0125280 A1    Jul. 1, 2004

(51) Int. Cl.
G03F 7/004   (2006.01)
G03F 7/30    (2006.01)
G02F 1/13    (2006.01)

(52) U.S. Cl. .................... 430/20; 430/319; 430/325; 430/327; 349/43; 349/106; 438/487; 438/669

(58) Field of Classification Search ................ 430/20, 430/319, 325, 327; 438/487, 669; 349/43, 349/106

See application file for complete search history.

(56) References Cited

U.S. PATENT DOCUMENTS

| 5,933,208 | A | 8/1999 | Kim |
| 6,038,006 | A | 3/2000 | Sasaki et al. |
| 6,429,916 | B1 | 8/2002 | Nakata et al. |
| 6,448,158 | B2 * | 9/2002 | Peng et al. .................. 438/487 |
| 6,466,281 | B1 | 10/2002 | Huang et al. |
| 6,873,382 | B2 * | 3/2005 | Chang et al. ............... 349/106 |
| 2001/0048490 | A1 | 12/2001 | Lim et al. |
| 2002/0016075 | A1 | 2/2002 | Peng et al. |

FOREIGN PATENT DOCUMENTS

| JP | 07-072473 | 3/1995 |
| JP | 2000-098368 | 4/2000 |
| WO | WO 93/17452 | 9/1993 |

OTHER PUBLICATIONS

UK Search Report; Feb. 26, 2004.

* cited by examiner

*Primary Examiner*—Richard Schilling
(74) *Attorney, Agent, or Firm*—McKenna Long & Aldridge LLP

(57) ABSTRACT

A method for fabricating an array substrate having a color filter on a thin film transistor structure for a liquid crystal display device is disclosed in the present invention. The method for fabricating the array substrate includes forming a gate line and a data line crossing each other and defining a pixel region, forming a thin film transistor at each intersection of the gate and data lines, wherein the thin film transistor includes a gate electrode, an active layer, a source electrode, and a drain electrode, forming a first insulating layer to cover the thin film transistor and the data line, forming a black matrix on the first insulating layer, except for a portion of the drain electrode, forming a second insulating layer on the first insulating layer to cover the black matrix, pattering the first and second insulating layers to expose a portion of the drain electrode, forming a first transparent electrode layer over a surface of the substrate to cover the patterned second insulating layer and the exposed portion of the drain electrode, patterning the first transparent electrode layer to form a pixel electrode in the pixel region, wherein the pixel electrode contacts the exposed portion of the drain electrode, forming a color filter on the pixel electrode, forming a second transparent electrode over a surface of the substrate to cover the color filter and the pixel electrode, wherein the second transparent electrode is in an amorphous state, irradiating a light to a portion of the second transparent electrode layer corresponding to the pixel region so as to crystallize the irradiated portion of the second transparent electrode, and forming a second pixel electrode in the pixel region by removing the non-crystallized portion of the second transparent electrode layer, wherein the second pixel electrode contacts the first pixel electrode over the black matrix.

32 Claims, 26 Drawing Sheets

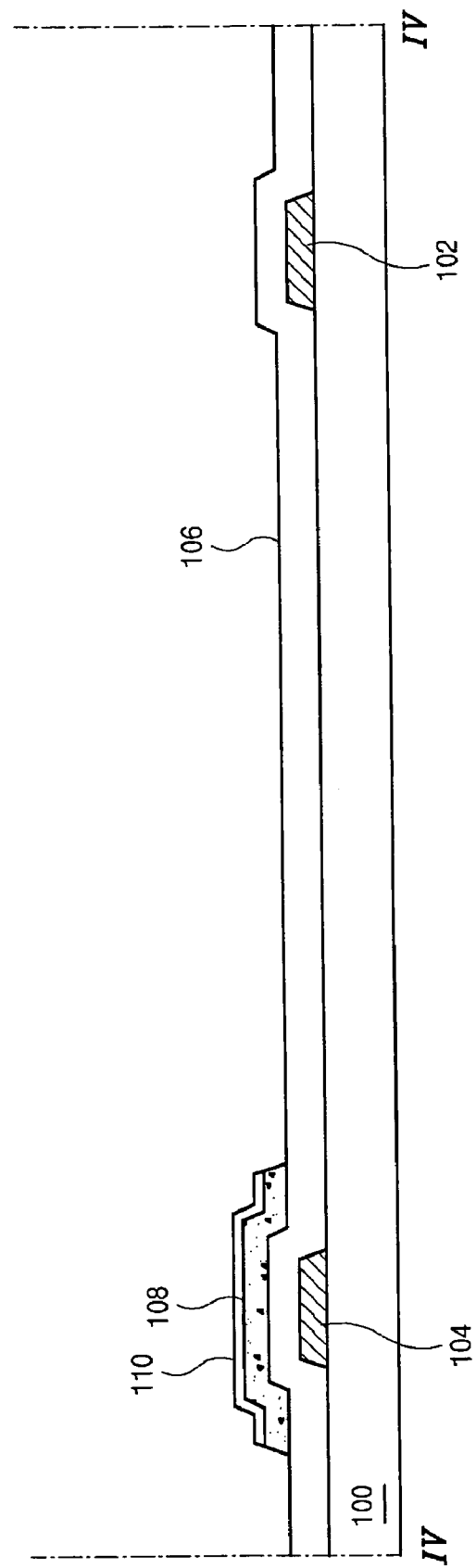

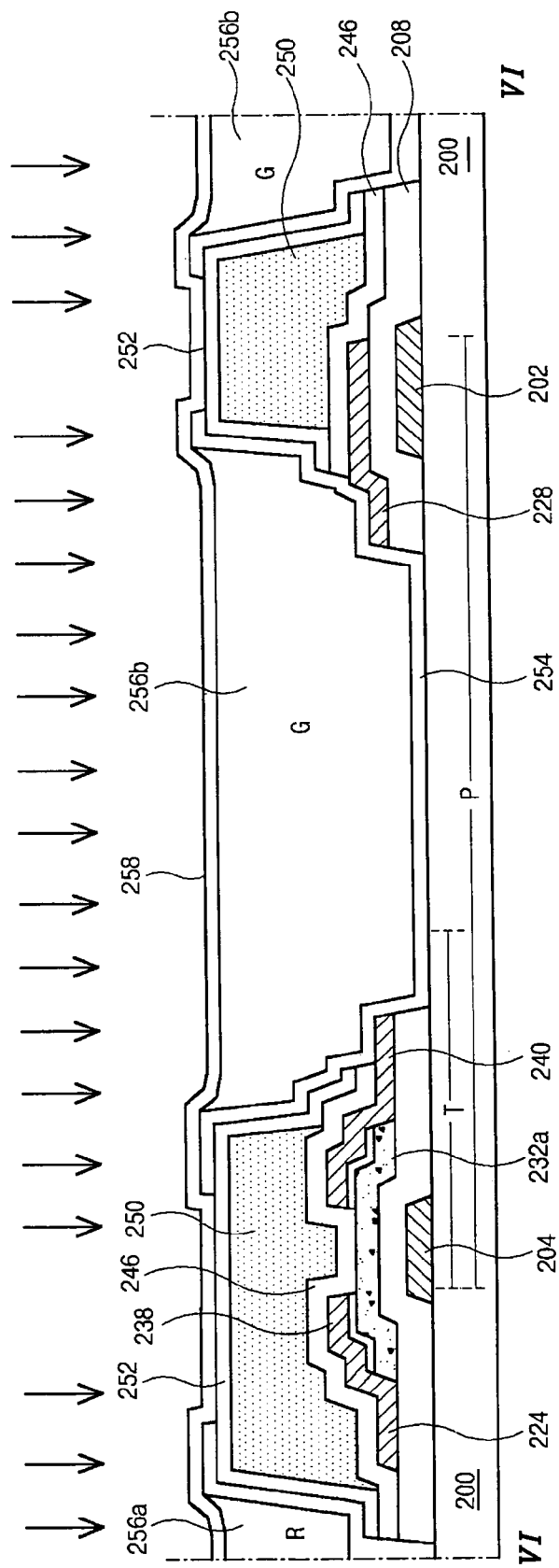

METHOD FOR FABRICATING ARRAY SUBSTRATE HAVING COLOR FILTER ON THIN FILM TRANSISTOR STRUCTURE FOR LIQUID CRYSTAL DISPLAY DEVICE

This application incorporates by reference Korean Application No. P2002-078006 filed on Dec. 9, 2002.

BACKGROUND OF THE INVENTION

1. Field of the Invention

The present invention relates to a liquid crystal display device, and more particularly, to a method for fabricating an array substrate having a color filter on a thin film transistor structure. Although the present invention is suitable for a wide scope of applications, it is particularly suitable for increasing an aperture ratio and simplifying the fabrication process.

2. Discussion of the Related Art

In general, since flat panel display devices are thin, light weight, and have a low power consumption, they have been used for portable display devices. Among the various types of flat panel display devices, liquid crystal display (LCD) devices are widely used for laptop computers and desktop computer monitors because of their superiority in resolution, color image display, and display quality.

Optical anisotropy and polarization characteristics of liquid crystal molecules are utilized to generate desirable images. Liquid crystal molecules have specific alignment directions that result from their own peculiar characteristics. The specific alignment directions can be modified by electric fields that are applied upon the liquid crystal molecules. In other words, the electric fields applied upon the liquid crystal molecules can change the alignment of the liquid crystal molecules. Due to the optical anisotropy, the incident light is refracted according to the alignment of the liquid crystal molecules.

Specifically, the LCD devices include upper and lower substrates having electrodes that are spaced apart and face into each other, and a liquid crystal material is interposed therebetween. Accordingly, when a voltage is applied to the liquid crystal material through the electrodes of each substrate, an alignment direction of the liquid crystal molecules is changed in accordance with the applied voltage, thereby displaying images. By controlling the applied voltage, the LCD device provides various light transmittances to display image data.

The liquid crystal display (LCD) devices are widely applied in office automation (OA) and video equipment due to their characteristics such as light weight, slim design, and low power consumption. Among different types of LCD devices, active matrix LCDs (AM-LCDs) having thin film transistors and pixel electrodes arranged in a matrix form provide high resolution and superiority in displaying moving images. A typical LCD panel has an upper substrate, a lower substrate, and a liquid crystal layer interposed therebetween. The upper substrate (referred to as a color filter substrate) includes a common electrode and color filters. The lower substrate (referred to as an array substrate) includes thin film transistors (TFT's), such as switching elements, and pixel electrodes.

As previously described, the operation of an LCD device is based on the principle that the alignment direction of liquid crystal molecules varies with applied electric fields between the common electrode and the pixel electrode. Accordingly, the liquid crystal molecules function as an optical modulation element having variable optical characteristics that depend upon the polarity of the applied voltage.

FIG. 1 is an expanded perspective view illustrating a related art active matrix liquid crystal display device. As shown in FIG. 1, the LCD device 11 includes an upper substrate 5 (referred to as a color filter substrate) and a lower substrate 22 (referred to as an array substrate) having a liquid crystal layer 14 interposed therebetween. On the upper substrate 5, a black matrix 6 and a color filter layer 8 are formed in an array matrix including a plurality of red (R), green (G), and blue (B) color filters surrounded by the black matrix 6. Additionally, a common electrode 18 is formed on the upper substrate 5 and covers the color filter layer 8 and the black matrix 6.

On the lower substrate 22, a plurality of thin film transistors T are formed in an array matrix corresponding to the color filter layer 8. A plurality of gate lines 13 and data lines 15 perpendicularly cross one another such that each TFT T is located adjacent to each intersection of the gate lines 13 and the data lines 15. Furthermore, a plurality of pixel electrodes 17 are formed on a pixel region P defined by the gate lines 13 and the data lines 15 of the lower substrate 22. The pixel electrode 17 is formed of a transparent conductive material having high transmissivity, such as indium tin oxide (ITO) or indium zinc oxide (IZO).

Still in FIG. 1, a storage capacitor C is disposed to correspond to each pixel P and connected in parallel to each pixel electrode 17. The storage capacitor C is comprised of a portion of the gate line 13 as a first capacitor electrode, a storage metal layer 30 as a second capacitor electrode, and an interposed insulator (shown as reference numeral 16 of FIG. 2). Since the storage metal layer 30 is connected to the pixel electrode 17 through a contact hole, the storage capacitor C electrically contacts the pixel electrode 17.

In the related art LCD device shown in FIG. 1, a scanning signal is applied to the gate electrode of the thin film transistor T through the gate line 13, and a data signal is applied to the source electrode of the thin film transistor T through the data line 15. As a result, the liquid crystal molecules of the liquid crystal material layer 14 are aligned and arranged by the operation of the thin film transistor T, and the incident light passing through the liquid crystal layer 14 is controlled to display an image. Namely, the electric fields induced between the pixel and common electrodes 17 and 18 re-arrange the liquid crystal molecules of the liquid crystal material layer 14 so that the incident light can be converted into the desired images in accordance with the induced electric fields.

When fabricating the LCD device 11 of FIG. 1, the upper substrate 5 is aligned with and attached to the lower substrate 22. In this process, the upper substrate 5 may be misaligned with respect to the lower substrate 22, and a light leakage may occur in the completed LCD device 11 due to a marginal error in attaching the upper and lower substrates 5 and 22.

FIG. 2 is a schematic cross-sectional view taken along line II-II of FIG. 1, illustrating a pixel of the related art liquid crystal display device.

As shown in FIG. 2, the related art LCD device includes the upper substrate 5, the lower substrate 22, and the liquid crystal layer 14. The upper and lower substrates 5 and 22 are spaced apart from each other, and the liquid crystal layer 14 is interposed therebetween. The upper and lower substrates 5 and 22 are often referred to as a color filter substrate and an array substrate, respectively, because the color filter layer 8 is formed upon the upper substrate 5 and a plurality of array elements are formed on the lower substrate 22.

In FIG. 2, the thin film transistor T is formed on the front surface of the lower substrate 22. The thin film transistor T includes a gate electrode 32, an active layer 34, a source electrode 36, and a drain electrode 38. Between the gate electrode 32 and the active layer 34, a gate insulation layer 16 is interposed to protect the gate electrode 32 and the gate line 13. As shown in FIG. 1, the gate electrode 32 extends from the gate line 13 and the source electrode 36 extends from the data line 15. All of the gate, source, and drain electrodes 32, 36, and 38 are formed of a metallic material while the active layer 34 is formed of silicon. A passivation layer 40 is formed on the thin film transistor T for protection. In the pixel region P, the pixel electrode 17 formed of a transparent conductive material is disposed on the passivation layer 40 and contacts the drain electrode 38 and the storage metal layer 30.

Meanwhile, as mentioned above, the gate electrode 13 acts as a first electrode of the storage capacitor C and the storage metal layer 30 acts as a second electrode of the storage capacitor C. Thus, the gate electrode 13 and the storage metal layer 30 constitute the storage capacitor C with the interposed gate insulation layer 16.

Still referring to FIG. 2, the upper substrate 5 is spaced apart from the lower substrate 22 over the thin film transistor T. On the rear surface of the upper substrate 5, a black matrix 6 is disposed in a position corresponding to the thin film transistor T, the gate line 13 and the data line 15. The black matrix 6 is formed on the entire surface of the upper substrate 5 and has openings corresponding to the pixel electrode 17 of the lower substrate 22, as shown in FIG. 1. The black matrix 6 prevents a light leakage in the LCD panel except for the portion for the pixel electrode 17. The black matrix 6 protects the thin film transistor T from the light such that the black matrix 6 prevents generation of a photo-current in the thin film transistor T. The color filter layer 8 is formed on the rear surface of the upper substrate 5 to cover the black matrix 6. Each of the color filters 8 has one of the red 8a, green 8b, and blue 8b colors and corresponds to one pixel region P where the pixel electrode 17 is located. A common electrode 18 formed of a transparent conductive material is disposed on the color filter layer 8 over the upper substrate 5.

In the related art LCD panel mentioned above, the pixel electrode 17 has a one-to-one correspondence with one of the color filters. Furthermore, in order to prevent a cross-talk between the pixel electrode 17 and the gate and data lines 13 and 15, the pixel electrode 17 is spaced apart from the data line 15 by the distance A and from the gate line 13 by the distance B, as shown in FIG. 2. The open spaces A and B between the pixel electrode 17 and the data and gate line 15 and 13 cause a malfunction such as a light leakage in the LCD device. Namely, the light leakage mainly occurs in the open spaces A and B so that the black matrix 6 formed on the upper substrate 5 should cover the open spaces A and B. However, when the upper substrate 5 is arranged with the lower substrate 22 or vice versa, a misalignment may occur between the upper substrate 5 and the lower substrate 22. Therefore, the black matrix 6 is extended to completely cover the open spaces A and B. That is, the black matrix 6 is designed to provide an aligning margin to prevent a light leakage. However, in the case of extending the black matrix, an aperture ratio of a liquid crystal panel is reduced as much as the aligning margin of the black matrix 6. Moreover, if there are errors in the aligning margin of the black matrix 6, a light leakage still occurs in the open spaces A and B, and deteriorates the image quality of an LCD device.

SUMMARY OF THE INVENTION

Accordingly, the present invention is directed to a method for fabricating an array substrate having a color filter on a thin film transistor (COT) structure for a liquid crystal display device that substantially obviates one or more of problems due to limitations and disadvantages of the related art.

Another object of the present invention is to provide a method for fabricating an array substrate having a color filter on a thin film transistor (COT) structure for a liquid crystal display device, which provides a high aperture ratio.

Another object of the present invention is to provide a method for fabricating an array substrate having a COT structure for a liquid crystal display device, which simplifies the manufacturing process and increases the manufacturing yield.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of fabricating a liquid crystal display device includes forming a gate line and a data line crossing each other and defining a pixel region, forming a thin film transistor at each intersection of the gate and data lines, wherein the thin film transistor includes a gate electrode, an active layer, a source electrode, and a drain electrode, forming a first insulating layer to cover the thin film transistor and the data line, forming a black matrix on the first insulating layer, except for a portion of the drain electrode, forming a second insulating layer on the first insulating layer to cover the black matrix, patterning the first and second insulating layers to expose a portion of the drain electrode, forming a first transparent electrode layer over a surface of the substrate to cover the patterned second insulating layer and the exposed portion of the drain electrode, patterning the first transparent electrode layer to form a pixel electrode in the pixel region, wherein the pixel electrode contacts the exposed portion of the drain electrode, forming a color filter on the pixel electrode, forming a second transparent electrode layer over a surface of the substrate to cover the color filter and the pixel electrode, wherein the second transparent electrode is in an amorphous state, irradiating a light to a portion of the second transparent electrode layer corresponding to the pixel region so as to crystallize the irradiated portion of the second transparent electrode, and forming a second pixel electrode in the pixel region by removing a non-crystallized portion of the second transparent electrode layer, wherein the second pixel electrode contacts the first pixel electrode over the black resin.

In another aspect of the present invention, a method of fabricating a liquid crystal display device includes forming a gate line in a first direction and a gate electrode extending from the gate line over a substrate, forming an active layer, an ohmic contact layer, a data line, a source electrode, and a drain electrode by using a same mask, wherein the data line and the gate line cross each other over the substrate and define a pixel region, the source electrode extends from the data line, the source and drain electrodes contact the ohmic contact layer, thereby forming a thin film transistor at each intersection of the gate and data lines, forming a first insulating layer to cover the thin film transistor and the data line, forming a black matrix on the first insulating layer, over the gate line, except for a portion of drain electrode, forming a second insulating layer on the first insulating layer to cover the black matrix, patterning the first and second insulating layers to expose a portion of the drain electrode, forming a first transparent electrode layer over a surface of the substrate to cover the patterned second insulating layer and the exposed portion of the drain electrode, patterning the first transparent electrode layer to form a pixel electrode in the pixel region, wherein the pixel electrode contacts the exposed portion of the drain electrode, forming a color filter on the pixel electrode, forming a second transparent electrode layer over a surface of the substrate to cover the color filter and the pixel electrode, wherein the second transparent electrode is in an amorphous state, irradiating a light to a portion of the second transparent electrode layer corresponding to the pixel region so as to crystallize the irradiated portion of the second transparent electrode, and forming a second pixel electrode in the pixel region by removing a non-crystallized portion of the second transparent electrode layer, wherein the second pixel electrode contacts the first pixel electrode around the color filter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings:

FIGS. 4A to 4I are cross-sectional views taken along a line IV-IV of FIG. 3, illustrating the process steps of fabricating the array substrate having a color filter on a thin film transistor (COT) structure according to the first embodiment of the present invention;

FIGS. 6A to 6M are cross-sectional views taken along a line VI-VI of FIG. 5, illustrating the process steps of fabricating an array substrate having the color filter on a thin film transistor (COT) structure according to the second embodiment of the present invention.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
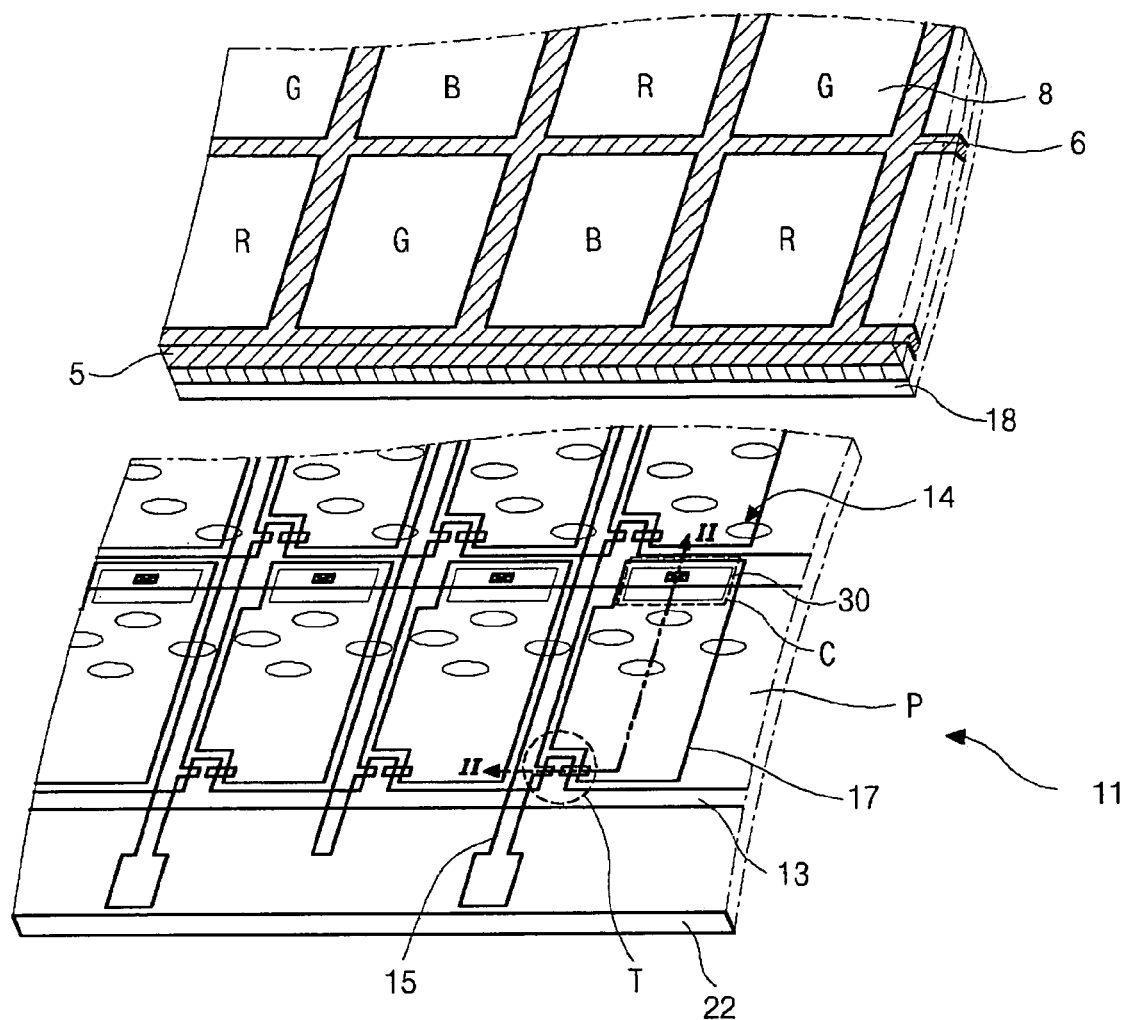
FIG. 1 is an expanded perspective view illustrating a related art liquid crystal display device.
Figure 2:
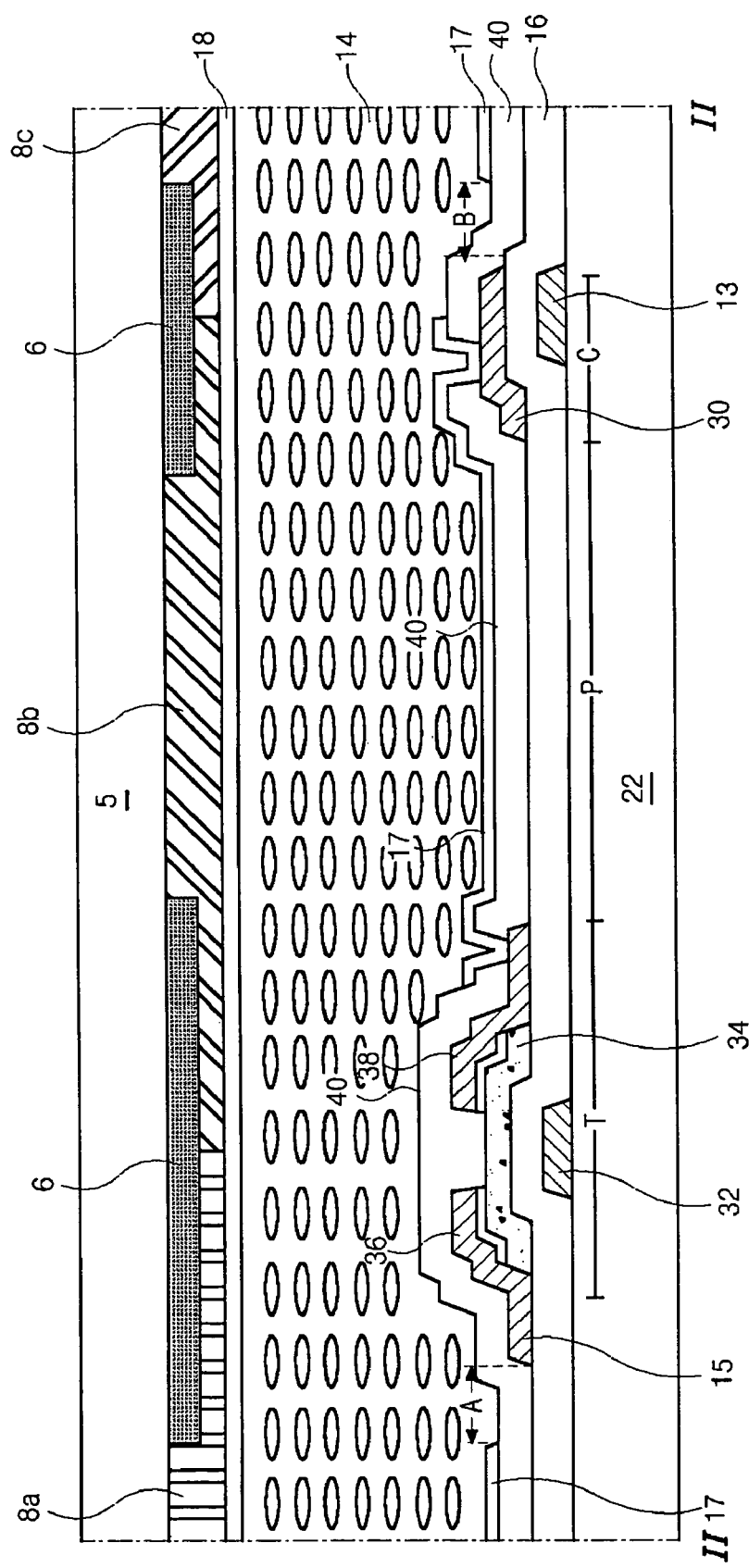
FIG. 2 is a schematic cross-sectional view taken along line II-II of FIG. 1, illustrating a pixel of the related art liquid crystal display device.
Figure 3:
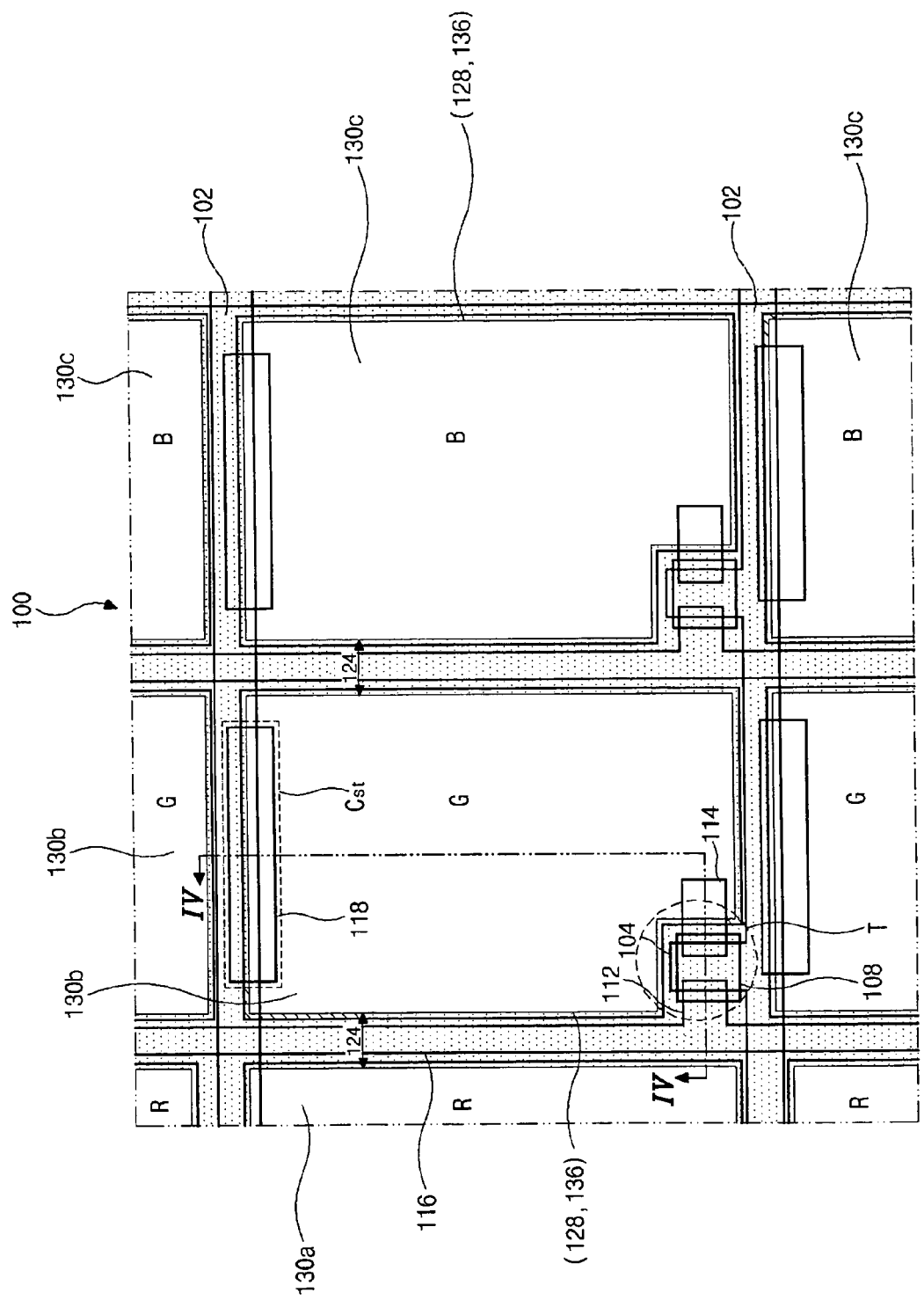
FIG. 3 is a partially enlarged plane view of an array substrate having a color filter on a thin film transistor structure according to a first embodiment of the present invention.

FIG. 3 is a partially enlarged plane view of an array substrate having a color filter on a thin film transistor structure according to a first embodiment of the present invention.

As shown in FIG. 3, an array substrate 100 includes a plurality of gate lines 102 disposed in a transverse direction and a plurality of data lines 116 disposed in a longitudinal direction. The plurality of gate lines 102 and the plurality of data lines 116 cross one another and define a pixel region P. A thin film transistor T is formed at each intersection of the gate line 102 and the data line 116. The thin film transistor T includes a gate electrode 104, an active layer 108, a source electrode 112, and a drain electrode 114. In the pixel regions P defined by the gate lines and data lines 102 and 116, a plurality of color filters 130a, 130b, and 130c are located therein. Additionally, a double-layered pixel electrode is disposed corresponding to each pixel region P. A first pixel electrode 128 and a second pixel electrode 136 have almost the same shape. Although not shown in FIG. 3, the first pixel electrode 128 is disposed beneath the color filter 130 and contacts the drain electrode 114, and the second pixel electrode 136 is disposed on the color filter 130 and contacts the first pixel electrode 128. Namely, the color filter 130 is located between the first and second pixel electrodes 128 and 136, and the second pixel electrode 136 electrically contacts the drain electrode 114 through the first pixel electrode 128.

Meanwhile, a storage capacitor $C_{ST}$ is included in a portion of the gate line 102 and a storage metal layer 118. Thus, the portion of the gate line 102 acts as a first electrode of the storage capacitor $C_{ST}$, and the storage metal layer 118 acts as a second electrode of the storage capacitor $C_{ST}$. The first and second pixel electrodes 128 and 136 electrically contact the storage metal layer 118, so that they are electrically connected to the storage capacitor $C_{ST}$ in parallel.

The array substrate 100 of FIG. 3 has a color filter on a thin film transistor (COT) structure. In such a COT structure, a black matrix 124 and the color filters 130 are formed on the array substrate 100. The black matrix 124 is disposed to correspond to the thin film transistors T and the gate lines 102 and the data lines 116, so that it prevents a light leakage in the LCD device. The black matrix 124 is formed of an opaque organic material, thereby blocking the light incident to the thin film transistors T. Also, it protects the thin film transistors T from the external impact.

Additionally, since the photolithography process is not used when forming the second pixel electrode 136 in the present invention, the color filters 130 underlying the second pixel electrode 136 are not damaged. Namely, since a photoresist and a developer for developing the photoresist are not utilized when forming the second pixel electrode 136, the number of process steps are decreased and the process stability is achieved in the present invention.

FIGS. 4A to 4I are cross-sectional views taken along a line IV-IV of FIG. 3, illustrating the process steps of fabricating the array substrate having a color filter on a thin film transistor (COT) structure according to the first embodiment of the present invention.

In FIG. 4A, a first metal layer is deposited on the surface of a substrate 100, and then patterned through the first mask process to form a gate line 102 and a gate electrode 104. Thereafter, a gate insulation layer 106 (a first insulating layer) is formed on the substrate 100 to cover the gate line 102 and the gate electrode 104. The gate insulation layer 106 is formed of an inorganic material, such as silicon nitride ($SiN_x$) and silicon oxide ($SiO_2$). An intrinsic amorphous silicon layer (a-Si:H) and then an $n^+$-doped amorphous silicon layer ($n^+$a-Si:H) are sequentially deposited on the entire surface of the gate insulation layer 106 and then simultaneously patterned through the second mask process to form an active layer 108 and an ohmic contact layer 110. The ohmic contact layer 110 is then located on the active layer 108.

Figure 4B:
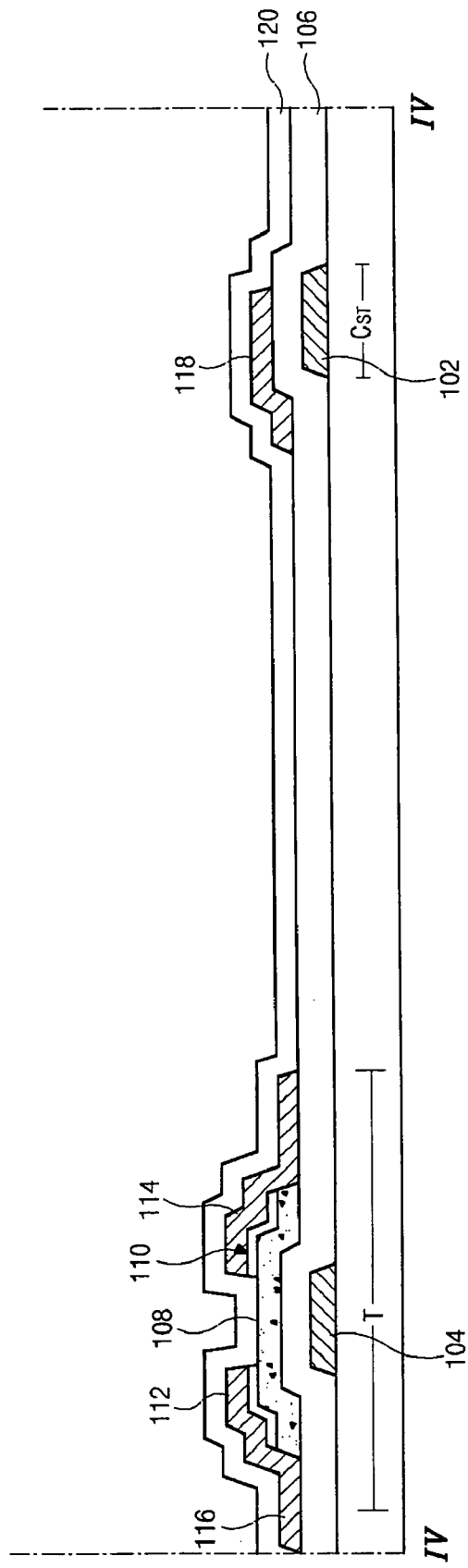

In FIG. 4B, after forming the active layer 108 and the ohmic contact layer 110, a second metal layer is deposited over the substrate 100, and patterned through the third mask process to form a source electrode 112, a drain electrode 114, a data line 116, and a storage metal layer 118. The second metal layer may be formed of one of chromium (Cr), copper (Cu), molybdenum (Mo), and an alloy of any combination thereof. The source electrode 112 extends from the data line 116 and contacts one portion of the ohmic contact layer 110. The drain electrode 114 is spaced apart from the source electrode 112 and then contacts the other portion of the ohmic contact layer 110. The storage metal layer 118 overlaps a portion of the gate line 102. Thereafter, a portion of the ohmic contact layer 110 between the source and drain electrodes 112 and 114 is etched by using the source and drain electrodes 112 and 114 as masks, and a thin film transistor T and a storage capacitor $C_{ST}$ are complete. For example, the source and drain electrodes 112 and 114 may be formed of a bi-layer of copper/molybdenum. As described with reference to FIG. 3, the thin film transistor T is comprised of the gate electrode 104, the active layer 108, the ohmic contact layer 110, the source electrode 112, and the drain electrode 114. And the storage capacitor $C_{ST}$ is comprised of the gate line 102, the storage metal layer 118, and the interposed first insulator 106.

Thereafter, a second insulating layer 120 is deposited over the entire surface of the substrate 100 to cover the patterned second metal layer. The second insulating layer 120 may be formed of silicon nitride ($SiN_X$) or silicon oxide ($SiO_2$). The second insulating layer 120 enhances the adhesion of an organic layer to be formed in the later process. The second insulating layer 120 improves the adhesion between the active layer 108 and the organic layer. If there is no contact problem between the active layer 108 and the organic material layer, the second insulating layer 120 is not necessary.

Figure 4C:
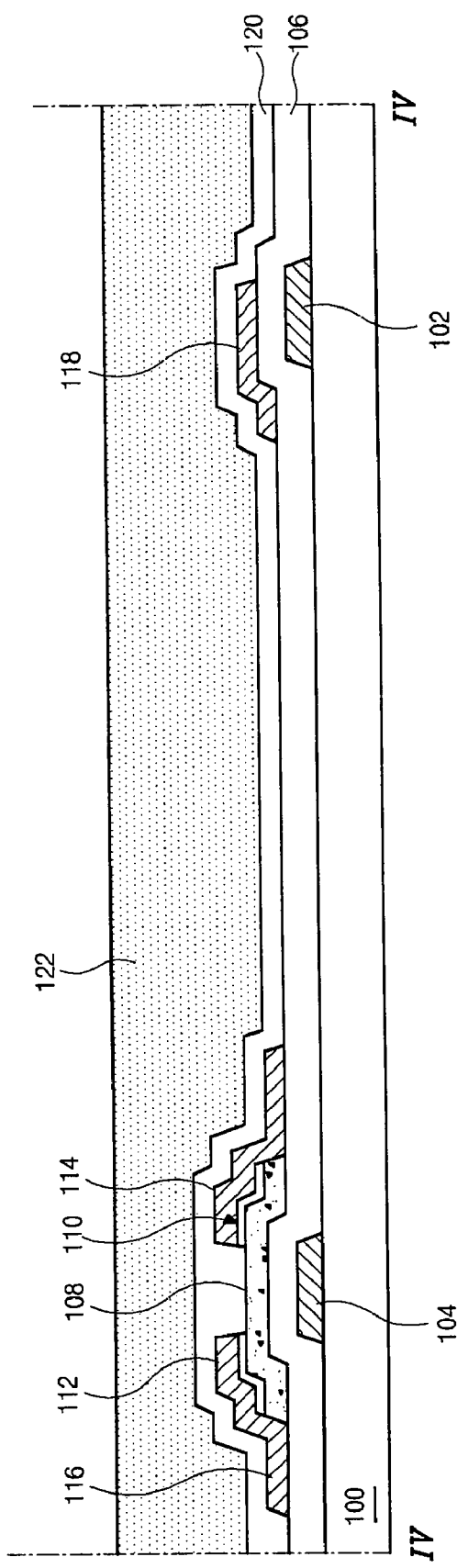

In FIG. 4C, an opaque organic material layer 122 having a low dielectric constant is deposited on the second insulating layer 120. The opaque organic material layer 122 has a black color, so that it becomes a black matrix.

Figure 4D:
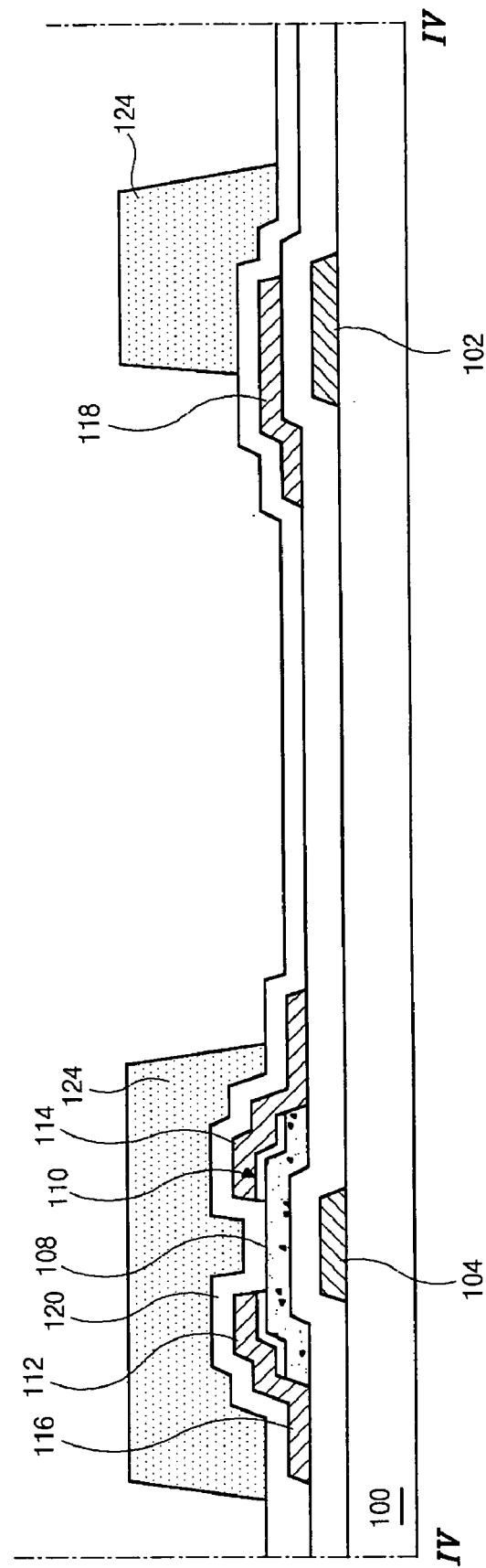

FIG. 4D shows the steps of forming a black matrix through the fourth mask process. The opaque organic material layer 122 formed on the second insulating layer 120 is patterned through the fourth mask process, so that a black matrix 124 is formed over the thin film transistor T, the data line 116, and the gate line 102. The black matrix 124 is formed of an organic material to protect the thin film transistor T. A transparent organic or inorganic material may be employed as a TFT-protection layer instead of the opaque organic material layer 122. However, an additional process of forming a black matrix on the upper substrate is required when using the transparent material.

Figure 4E:
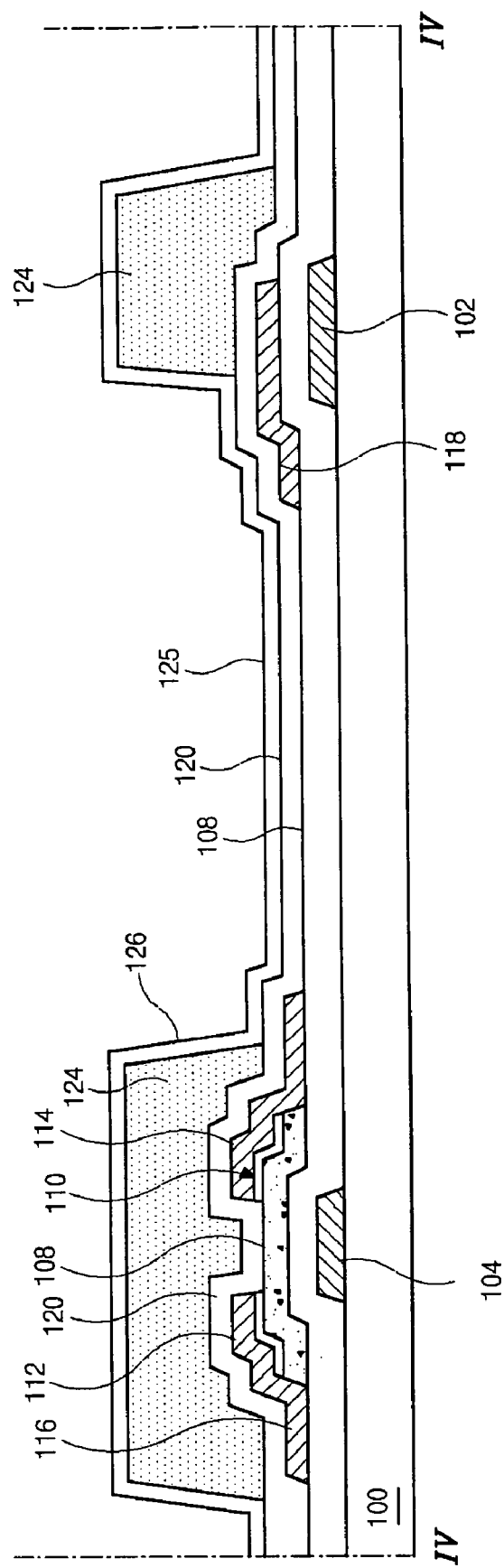

In FIG. 4E, a third insulating layer 126 is formed over the entire surface of the substrate 100 to cover the black matrix 124. The third insulating layer 126 may be formed of an inorganic insulating material, such as silicon nitride ($SiN_X$) or silicon oxide ($SiO_2$), or an organic material insulating material, such as benzocyclobutene (BCB) or acrylic resin.

Figure 4F:
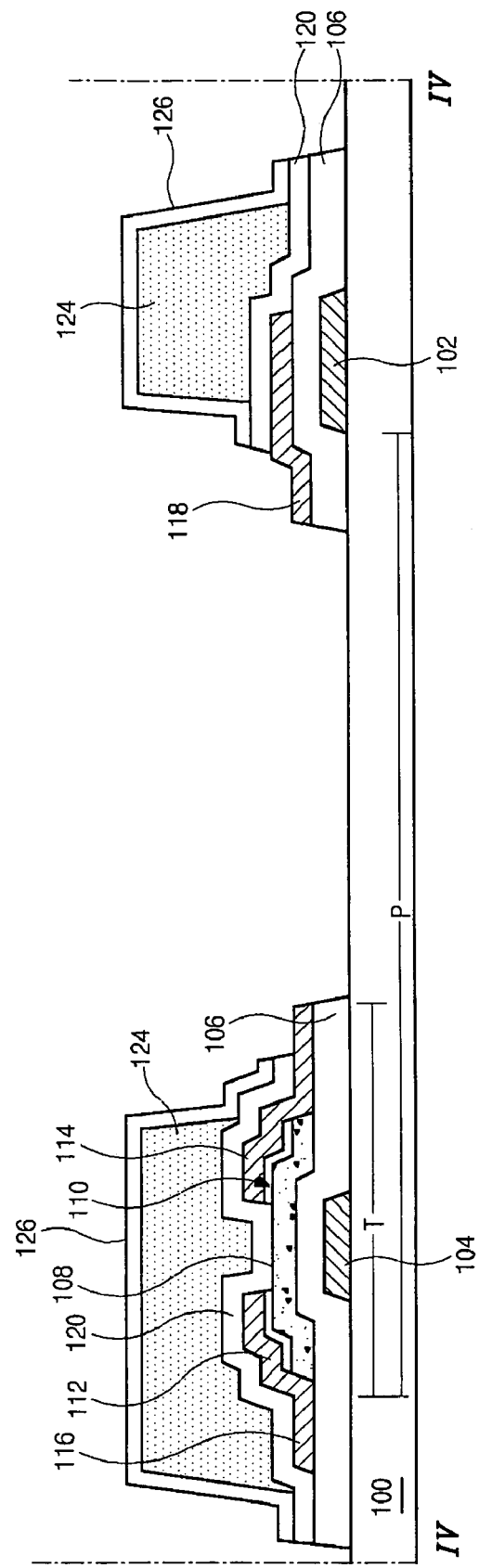

Now in FIG. 4F, the first, second, and third insulating layers 108, 120, and 125 are simultaneously patterned through the fifth mask process. Thus, an end side portion of the drain electrode 106 and an end side portion of the storage metal layer 118 are exposed. Although FIG. 4F shows that the substrate 100 is exposed by patterning the first insulating layer 108, the first insulating layer 108 may remain, and only the second and third insulating layers 120 and 125 may be patterned to expose the side portions of the drain electrode 106 and storage metal layer 118. Furthermore, the remaining portion of the first gate insulating layer 106 on the substrate 100 may control the height of a color filter to be formed in the later process.

Figure 4G:
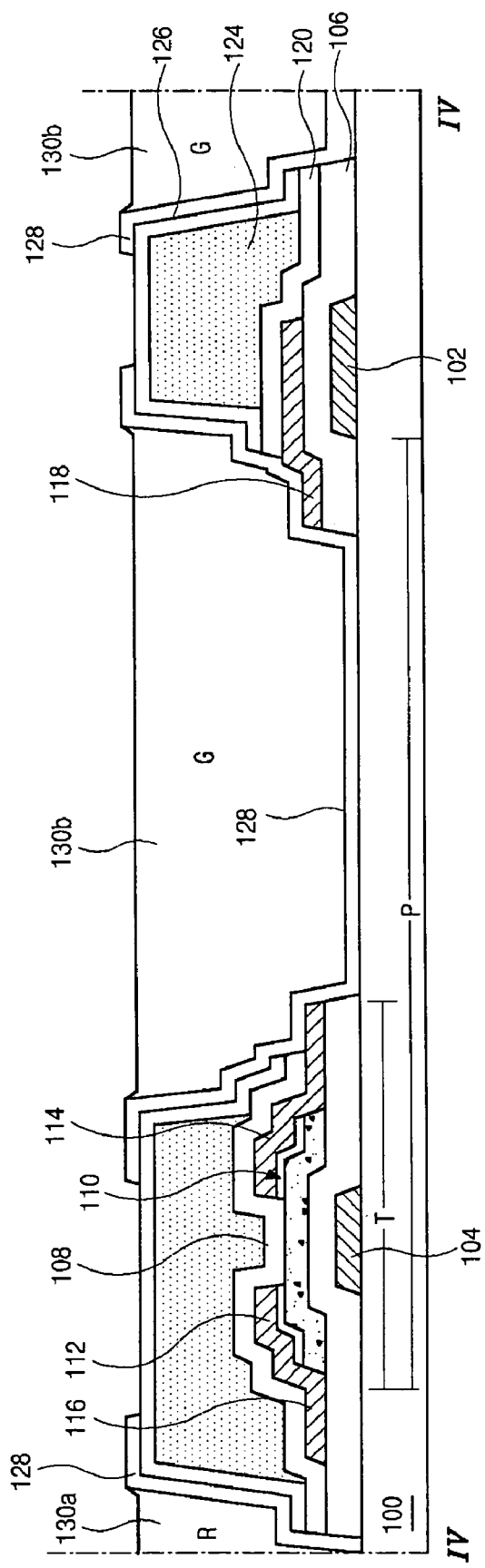

FIG. 4G shows the step of forming a first pixel electrode 128 and color filers 130. A first transparent electrode layer of indium tin oxide (ITO) or indium zinc oxide (IZO) is deposited over the entire surface of the substrate 100 to cover the patterned third insulating layer 126 and to contact the exposed side portions of the drain electrode 106 and the storage metal layer 118. Thereafter, the first transparent electrode layer is patterned through the sixth mask process, so that the first pixel electrode 128 is formed in the pixel region P, except for a portion over the gate electrode 104. As shown in FIG. 4G, the first pixel electrode 128 contacts both the side portions of the drain electrode 106 and the storage metal layer 118. After forming the first pixel electrode 128, a color resin is formed on the first pixel electrode 128 and then developed to form color filters 130a, 130b, and 130c having red (R), green (G), and blue (B). As described above, the color filters 130a, 130b, and 130c for displaying the full spectrum of colors are formed in the pixel regions P on the first pixel electrode 128. When developing the color resin, the first pixel electrode 128 may prevent a developer for patterning the color filters from penetrating into the gate insulation layer 106. In the step portions of the gate line 102 and the gate electrode 104, the gate insulation layer 106 may be formed with a poor quality and may have defects, such as pinholes and cracks. Therefore, when developing the color filters, the developer for the color filters may penetrate into the gate insulation layer 106 and then deteriorate the gate line 102 and the gate electrode 104. By forming the first pixel electrode 128, such deterioration can be prevented and the process stability can be achieved.

Figure 4H:
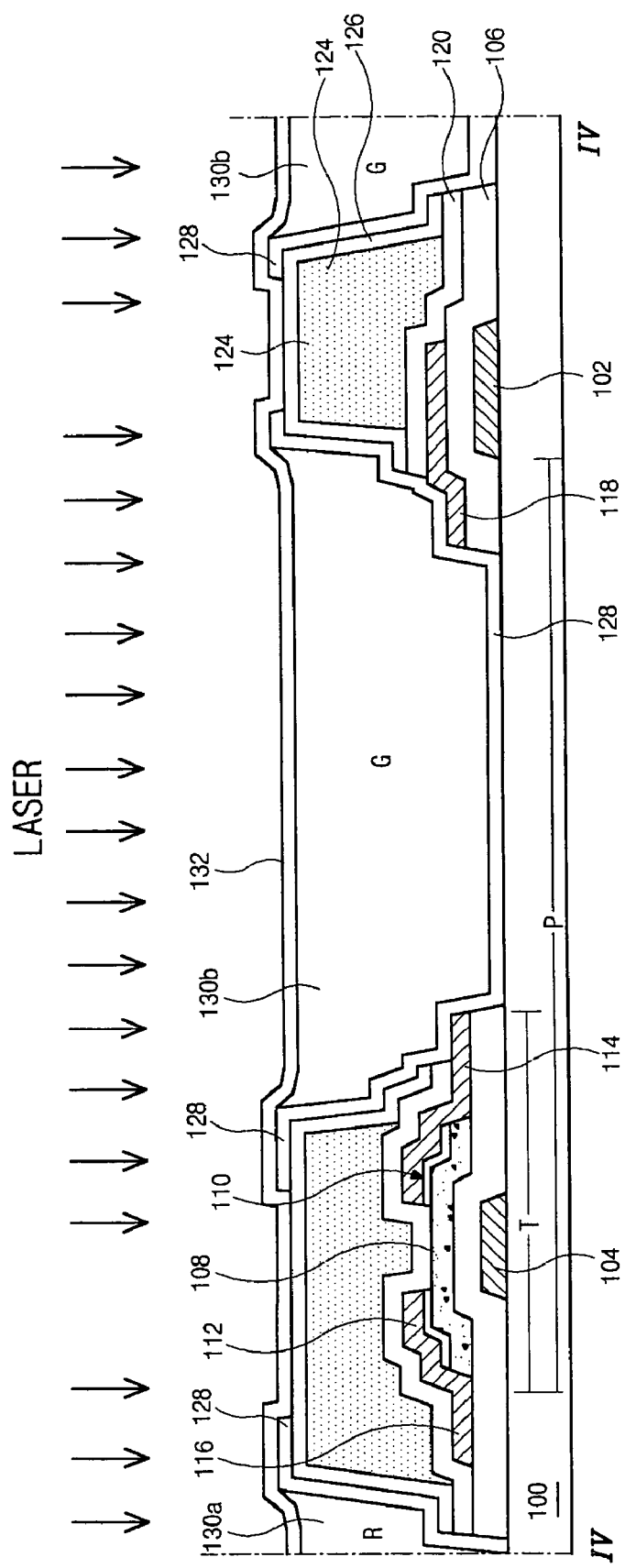

Now in FIG. 4H, a second transparent electrode layer 132 is formed on the color filters 130, the exposed portions of the first pixel electrode 128, and the exposed portions of the third insulating layer 126. The second transparent electrode layer 132 is formed of indium tin oxide (ITO) or indium zinc oxide (IZO) similar to the first transparent electrode layer. At this time, the second transparent electrode layer 132 is in an amorphous state. Then, a KrF excimer laser partially irradiates the second transparent electrode layer 132. Specially, the KrF excimer laser irradiates the pixel portions of the second transparent electrode layer 132 which corresponds to the pixel regions P, and thus the irradiated portions of the second transparent electrode layer 132 become crystallized. When crystallizing the pixel portions of the second transparent electrode layer 132, a strong UV light from a UV lamp may fully irradiate instead of the KrF excimer laser.

Figure 4I:
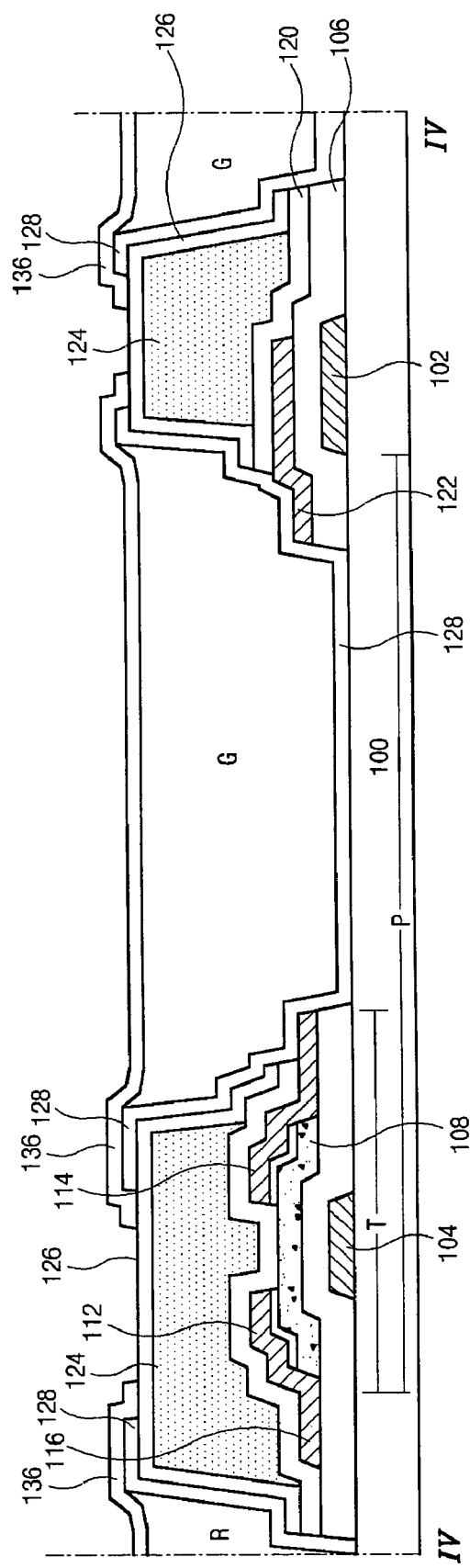

FIG. 4I shows the process step of patterning the second transparent electrode layer 132 to form a double-layered pixel electrode (i.e., often referred to as a sandwich pixel electrode). After the crystallization of the second transparent electrode layer 132, the second transparent electrode layer 132 is etched by oxalic acid $[(COOH)_2.H_2O+H_2O]$, and thus the amorphous portions of the second transparent electrode layer 132 are removed while the crystallized portions of the second transparent electrode layer 132 remain, whereby the crystallized portions of the transparent electrode layer 132 become second pixel electrodes 136. Due to the etch selectivity between the amorphous and crystallized portions of the second transparent electrode layer 132, the second pixel electrode 136 can be formed without any photolithography process. Accordingly, the second pixel electrode 136 contacting the first pixel electrode 128 around the color filter 130 is finally formed. Namely, the sandwich pixel electrode comprised of the first and second pixel electrodes 128 and 136 is formed corresponding to each pixel region P.

As mentioned before, each color filter 130 is interposed between the first and second pixel electrodes 128 and 136 in the present invention. And in the first embodiment of the present invention, the black matrix 124 and the color filters 130 are formed in the lower substrate 100, so that the liquid crystal display device can have a high aperture ratio. Further, since the pixel electrode has a double-layered structure, the process stability is improved during the fabricating process of the array substrate. Furthermore, since no photoresist and no photolithography process are required when forming the second pixel electrode 136, a developer and/or a stripper will not be applied to the array substrate, so that the underlying color filters 130 will not be damaged.

In the first embodiment of the present invention, the array substrate having a color filter on a thin film transistor (COT) structure is fabricated through the six-mask process. However, the number of the mask process can be reduced.

Figure 5:
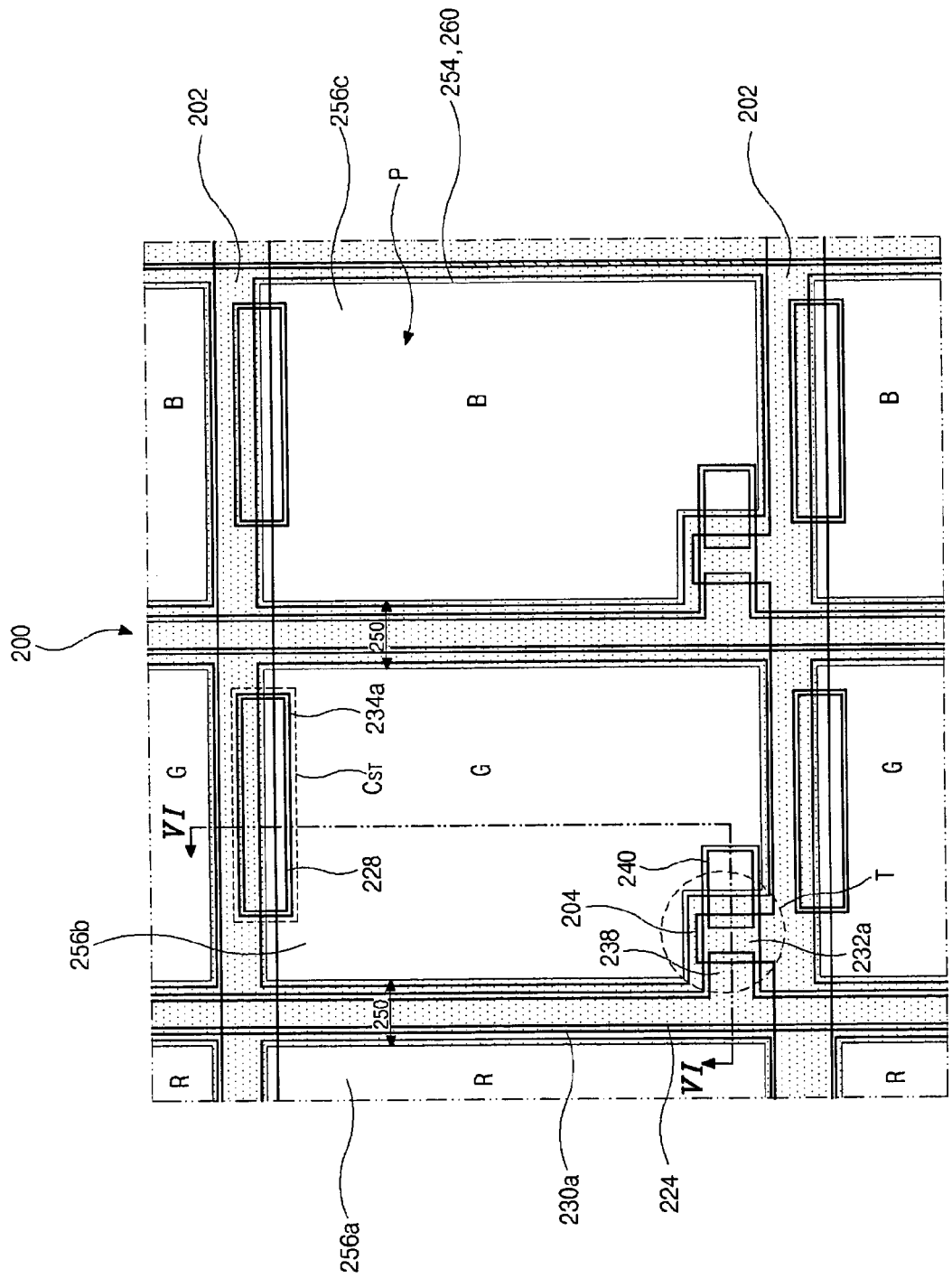
FIG. 5 is a partially enlarged plane view of an array substrate having a color filter on a thin film transistor structure according to a second embodiment of the present invention.

FIG. 5 is a partially enlarged plane view of an array substrate having a color filter on a thin film transistor (COT) structure according to a second embodiment of the present invention.

As shown in FIG. 5, an array substrate 200 includes a plurality of gate lines 202 disposed in a transverse direction and a plurality of data lines 224 disposed in a longitudinal direction. The plurality of gate lines 202 and the plurality of data lines 224 cross one another and define a plurality of pixel regions P. A thin film transistor T is formed at each intersection of the gate line 202 and the data line 224. The thin film transistor T includes a gate electrode 204, an active layer 232a, a source electrode 238, and a drain electrode 240. In the pixel regions P defined by the plurality of gate lines and data lines 202 and 224, a plurality of color filters 256a, 256b, and 256c are located therein. Additionally, a double-layered pixel electrode is disposed corresponding to each pixel region P. A first pixel electrode 254 and a second pixel electrode 260 have almost the same shape. Although not indicated in FIG. 5, the first pixel electrode 254 is disposed beneath the color filter 256 and contacts the drain electrode 240, and the second pixel electrode 260 is disposed on the color filter 256 and contacts the first pixel electrode 254. Namely, the color filter 256 is located between the first and second pixel electrodes 254 and 260, and the second pixel electrode 260 electrically contacts the drain electrode 240 through the first pixel electrode 254.

Meanwhile, a storage capacitor $C_{ST}$ is included in a portion of the gate line 202 and a storage metal layer 228. Thus, the portion of the gate line 202 acts as a first electrode of the storage capacitor $C_{ST}$, and the storage metal layer 228 acts as a second electrode of the storage capacitor $C_{ST}$. The first and second pixel electrodes 254 and 260 electrically contact the storage metal layer 228, so that they are electrically connected to the storage capacitor, $C_{ST}$ in parallel.

In the second embodiment of the present invention, the active layer 232a and the source and drain electrodes 238 and 240 are formed through the same patterning process, whereby the active layer is disposed underneath the source and drain electrodes 238 and 240. Additionally, since the data line 224 and the storage metal layer 228 are formed with the source and drain electrodes 238 and 240 at the same process, other silicon layers 230a and 234a are further disposed underneath the data line 224 and the storage metal layer 228, respectively.

The array substrate 200 of FIG. 5 also has a color filter on a thin film transistor (COT) structure. In such a COT structure, a black matrix 250 and the color filters 256 are formed on the array substrate 200. The black matrix 250 is disposed to correspond to the thin film transistors T and the gate lines 202 and the data lines 224, so that it prevents a light leakage in the LCD device. The black matrix 250 is formed of an opaque organic material, thereby blocking the light incident to the thin film transistors T. Also, it protects the thin film transistors T from the external impact.

Additionally, the photolithography process is not used when forming the second pixel electrode 260 in the present invention. Thus, the color filters 256 underlying the second pixel electrode 260 are not damaged by a developer and/or a stripper. Namely, since a photoresist and a developer developing the photoresist are not utilized when forming the second pixel electrode 260, the number of process steps is decreased and the process stability is achieved in the present invention.

FIGS. 6A to 6M are cross-sectional views taken along a line VI-VI of FIG. 5, illustrating the process steps of fabricating an array substrate having a color filter on a thin film transistor (COT) structure according to the second embodiment of the present invention.

Figure 6A:
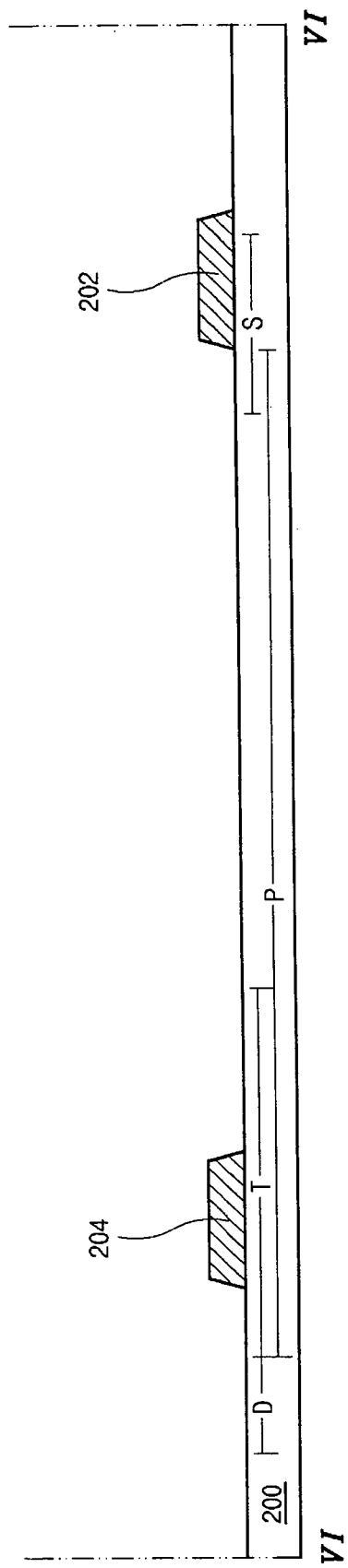

In FIG. 6A, a thin film transistor region T, a pixel region P, a data region D, and a storage region S are defined on a substrate 200. A first metal layer is deposited on the surface of a substrate 200, and then patterned through the first mask process to form a gate line 202 and a gate electrode 204.

Figure 6B:
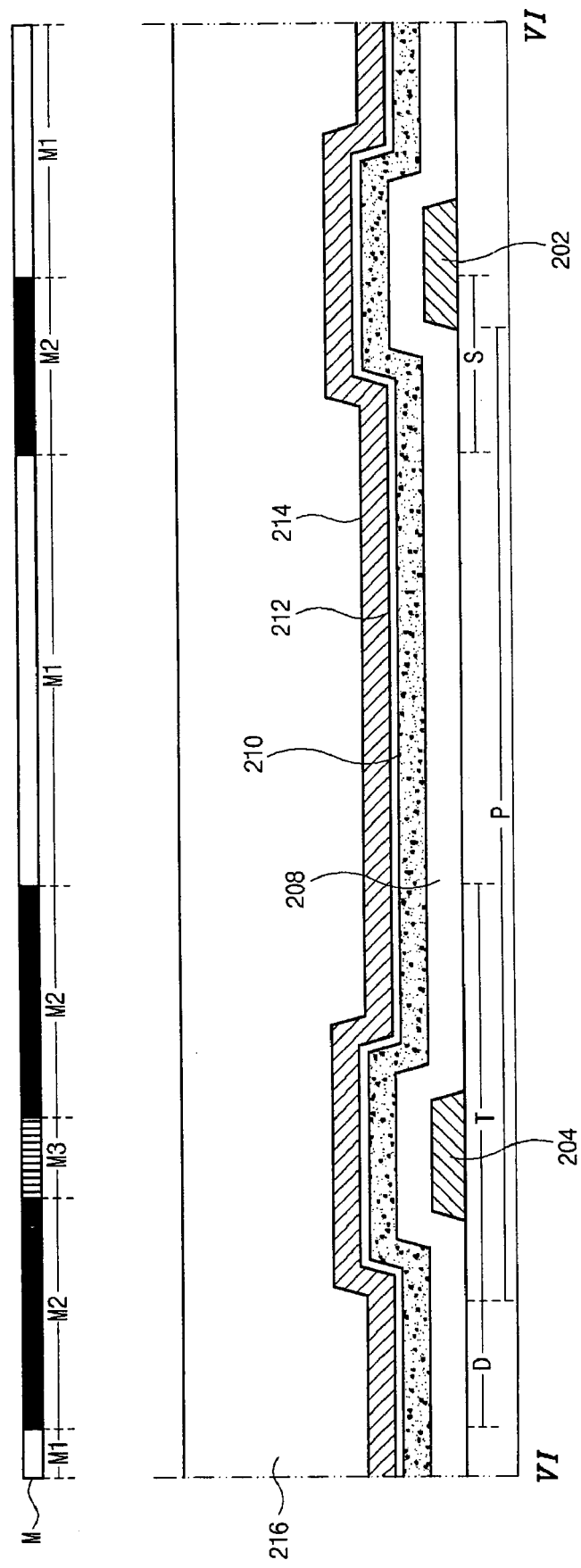

Next in FIG. 6B, a gate insulation layer 208 (a first insulating layer) is formed on the substrate 200 to cover the gate line 202 and the gate electrode 204. The gate insulation layer 208 is formed of an inorganic material, such as silicon nitride ($SiN_x$) and silicon oxide ($SiO_2$). An intrinsic amorphous silicon layer (a-Si:H) 210, an $n^+$-doped amorphous silicon layer ($n^+$a-Si:H) 212, and a second metal layer 214 are sequentially deposited on the entire surface of the gate insulation layer 208. The second metal layer 214 may be formed of one of chromium (Cr), molybdenum (Mo), copper (Cu), tungsten (W), titanium (Ti), aluminum (Al), aluminum alloy (e.g., AlNd), and an alloy of any combination thereof. Thereafter, a photoresist 216 is formed on the second metal layer 214.

Additionally, a mask M having a transmitting portion M1, a shielding portion M2 and a half-transmitting portion M3 is located over the photoresist 216 for the second mask process. The transmitting portion M1 allows the light to fully pass through and corresponds to the pixel region P except for the portions for thin film transistor region T and storage region S. The shielding portion M2 thoroughly blocks the light during the second mask process and corresponds to the data region D, the thin film transistor region T, and the storage region S. The half-transmitting portion M3 may be a plurality of slits or a semitransparent film so that only a half portion of the light can pass through. The half-transmitting portion M3 corresponds to the portion of the thin film transistor region T, especially to the gate electrode 204.

After disposing the mask M in accordance with the above description, a light exposure is performed to the photoresist 216 through the mask M. The light passing through the transmitting portion M1 fully irradiates the corresponding regions, while the light passing through the half-transmitting portion M3 weakly irradiates the corresponding regions.

Figure 6C:
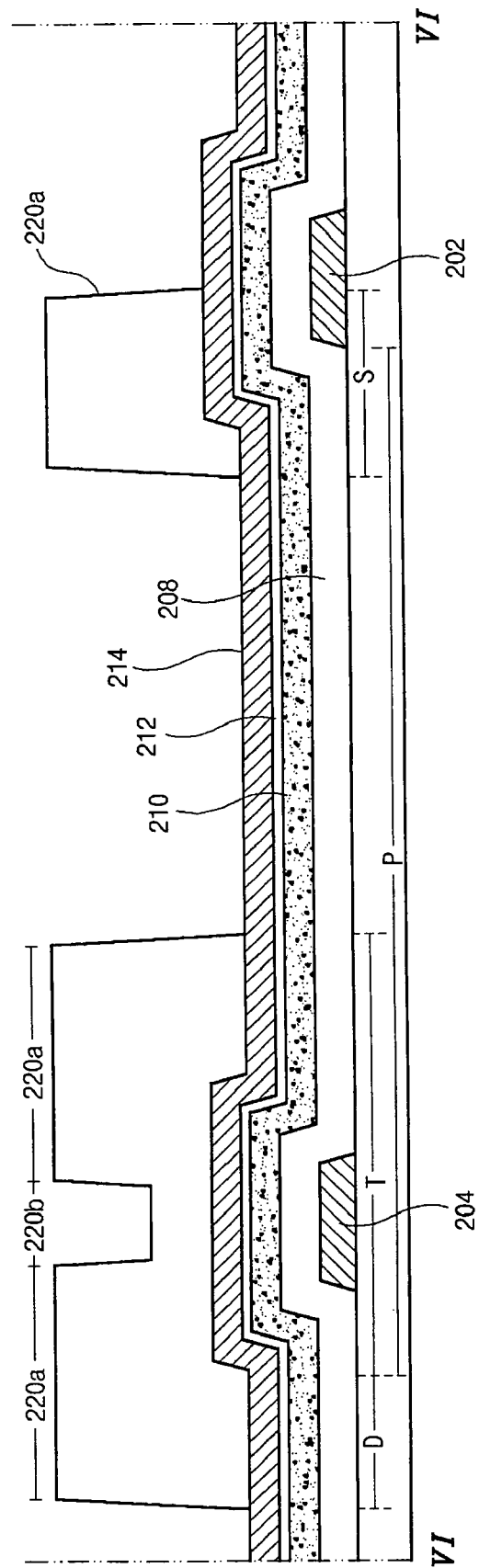

FIG. 6C show the process step of developing the photoresist 216 after the light exposure. After developing the photoresist 216, the portions corresponding to the shielding portion M2 of the mask M fully remain, but the portions corresponding to the transmitting portions M1 are fully removed. Further, the portion corresponding to the half-transmitting portion M3 is removed and remains partially. Therefore, after the developing process of the photoresist 216, a first photo-pattern 220a and a second photo-pattern 220b are remainders on the second metal layer 214. As shown in FIG. 4, the second photo-pattern 220b has a height smaller than the first photo-pattern 220a because it was weakly irradiated by the feeble light passed through the half-transmitting portion M3 of the mask M. The height of the first photo-pattern 220a is almost double of the second photo-pattern 220b.

Figure 6D:
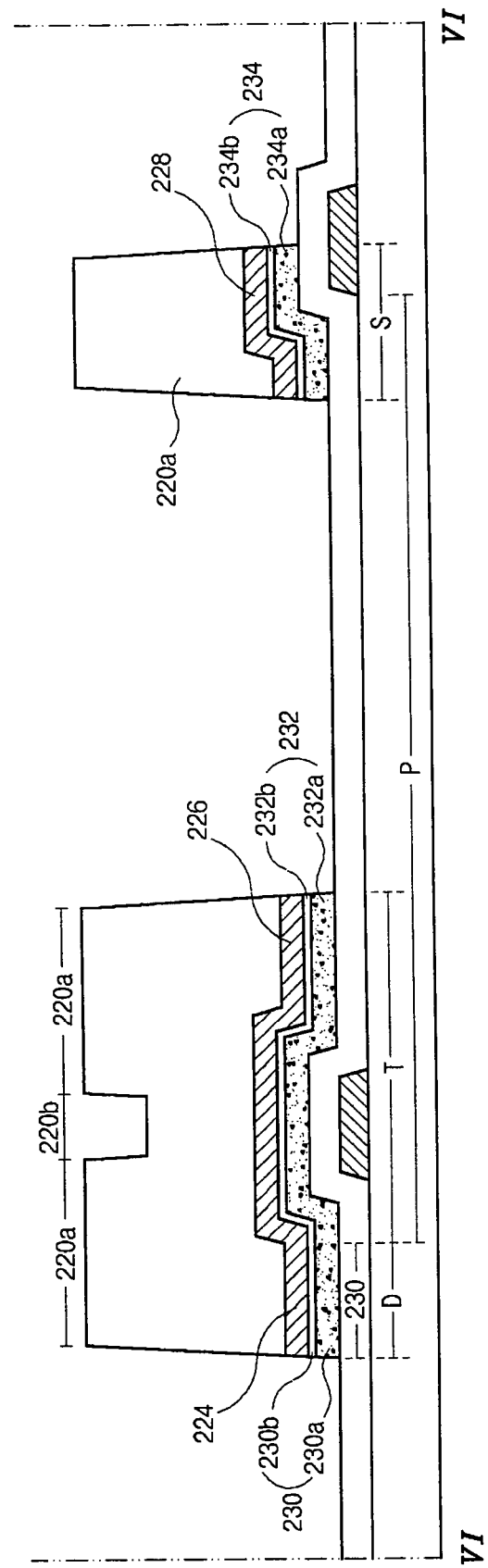

In FIG. 6D, the exposed portions of the second metal layer 214, the $n^+$-doped amorphous silicon layer 212 and the intrinsic amorphous silicon layer 210 are simultaneously etched. Thus, a data line 224, a source-drain metal layer 226, and a storage metal layer 228 are formed underneath the photo-patterns 220. The data line 224 is corresponding to the data region D, and the storage metal layer 228 is corresponding to the storage region. The source-drain metal layer 226 extends from the data line 224 and corresponds to the thin film transistor region T. Since the n+-doped amorphous silicon layer 212 and the intrinsic amorphous silicon layer 210 are etched at the same time with the second metal layer 214, first to third semiconductor patterns 230, 232 and 234 are formed underneath the data line 224, the source-drain metal layer 226, and the storage metal layer 228, respectively. The first to third semiconductor patterns 230, 232, and 234 are comprised of the patterned intrinsic amorphous silicon layers 230a, 232a, and 234a, and the patterned n+-doped amorphous silicon layers 230b, 232b, and 234b.

Figure 6E:
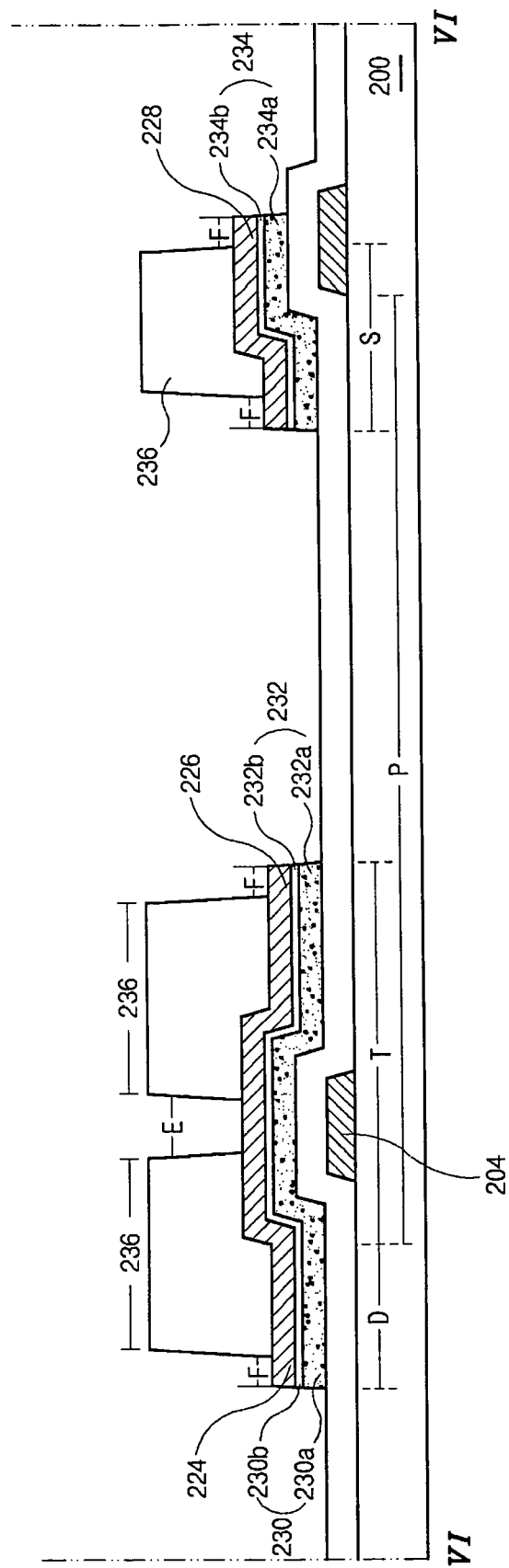

FIG. 6E shows the process step of ashing the photo-patterns 220a and 220b in order to form an active channel of the thin film transistor. The ashing process is one of dry etching processes and partially removes the photo-patterns 220. During the ashing process, the second photo-pattern 220b is completely removed, and the first photo-pattern 220a is partially removed as much as the second photo-pattern 220b. Namely, while completely removing the second photo-pattern 220b, the first photo-pattern 220a is partially removed, so that the height and width of the first photo-pattern 220a are lessened. As a result, the center portion E of the source-drain metal layer 226 and the side portions F of the data line 224 and storage metal layer 228 are exposed. Ashed photo-patterns 236 have smaller width and height than the first photo-pattern 220a and expose the side portions F of the data line 224 and the storage metal layer 228. The center portion E corresponding to the gate electrode 204 is completely exposed.

Figure 6F:
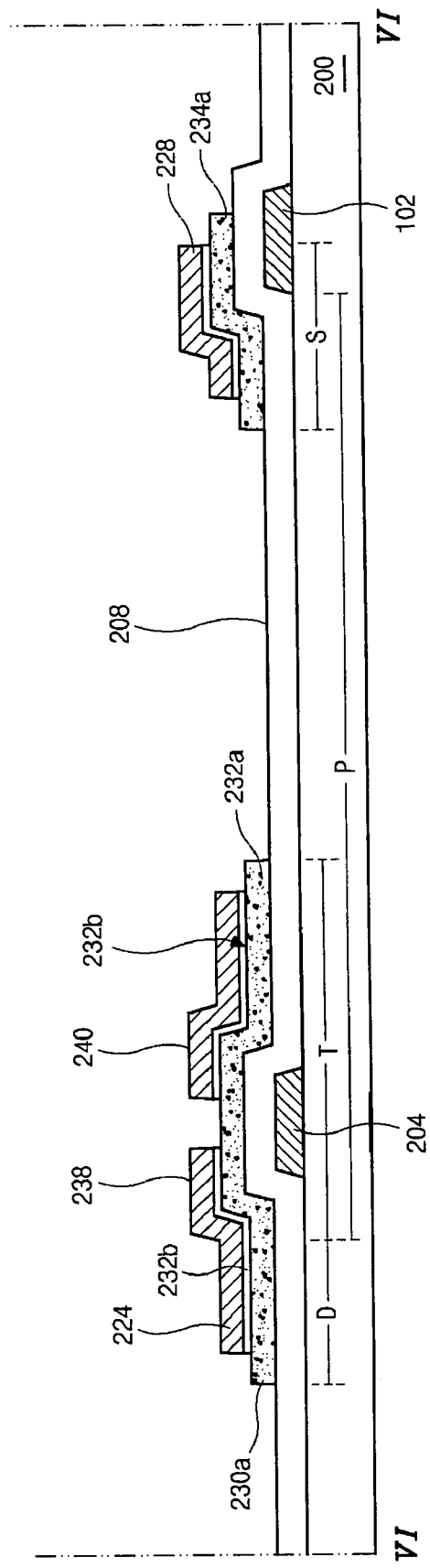

After the ashing process, the exposed portions E and F are removed until the intrinsic amorphous silicon layers 230a, 232a, and 234a are exposed, as shown in FIG. 6F. Then, the ashed photo-patterns 236 are stripped out from the source-drain metal layer 226. Accordingly, a source electrode 238 and a drain electrode 240 are finally formed over an active layer 232a (i.e., the intrinsic amorphous silicon layer). An active channel between the source and drain electrodes 238 and 240 are also formed on the active layer 232a. The active channel is disposed above the gate electrode 204. The source electrode 238 extends from the data line 224, and the drain electrode 240 is spaced apart from the source electrode 238 across the gate electrode 240. As illustrated with reference to FIG. 5, the storage metal layer 238 has an island shape. In FIG. 6F, since the portions E and F of the metal layer and the n+-doped amorphous silicon layer are simultaneously removed, the intrinsic amorphous silicon layers 230a, 232a, and 234a are exposed around the patterned metal layers 224, 238, 240, and 228. The intrinsic amorphous silicon layer 232a corresponding to the thin film transistor region T is referred to as an active layer, and the n+-doped amorphous silicon layers 232b on the active layer 232a are referred to as ohmic contact layers.

Meanwhile, the storage metal layer 228 overlaps a portion of the gate line 202, so that the storage capacitor $C_{ST}$ of FIG. 5 is comprised of the portions of gate line 202, the storage metal layer 228, and the interposed first insulating layer 208. Further, as described with reference to FIG. 5, the thin film transistor T is comprised of the gate electrode 204, the active layer 232a, the ohmic contact layers 232b, the source electrode 228, and the drain electrode 240.

Figure 6G:
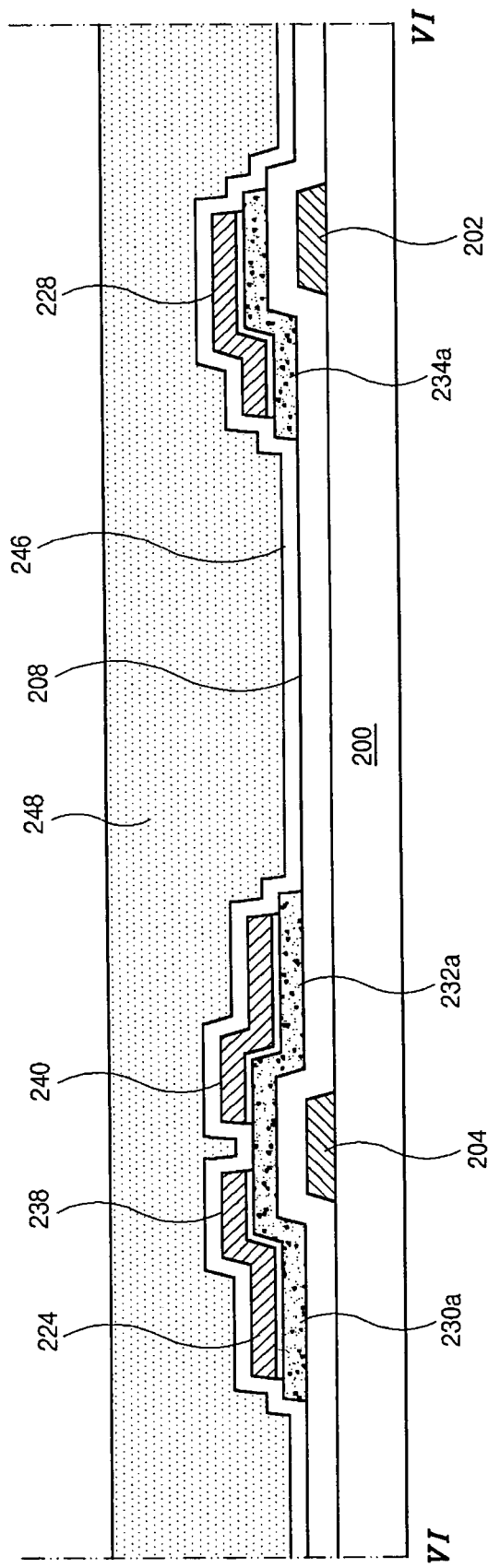

Next in FIG. 6G, a second insulating layer 246 is deposited over the entire surface of the substrate 200 to cover the patterned second metal layer. The second insulating layer 246 may be formed of silicon nitride ($SiN_x$) or silicon oxide ($SiO_2$). The second insulating layer 246 enhances the adhesion of an opaque organic layer 248 to be formed in the later process. The second insulating layer 246 improves the adhesion between the active layer 232a and the opaque organic layer 248. If there is no adhesion problem between the active layer 232a and the organic material layer, the second insulating layer 246 is not necessary. After forming the second insulating layer 246, the opaque organic material layer 248 having a low dielectric constant is deposited on the second insulating layer 246. The opaque organic material layer 248 has a black color, so that it becomes a black matrix.

Figure 6H:
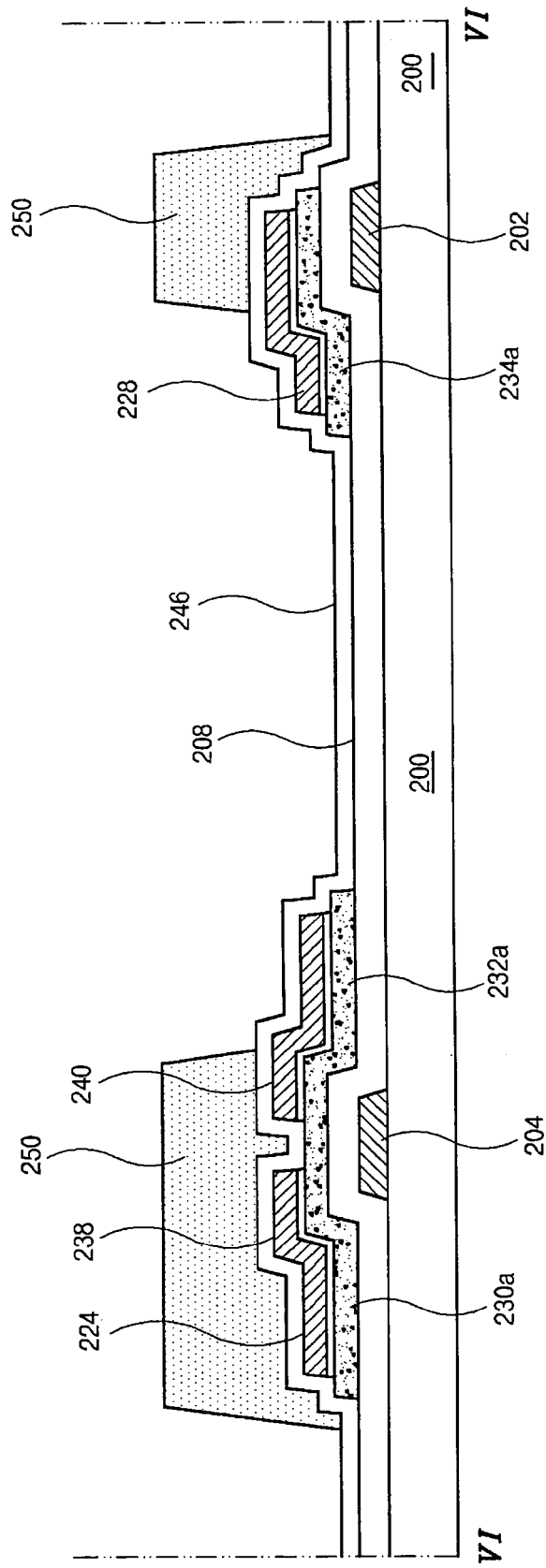

FIG. 6H shows the steps of forming a black matrix through the third mask process. The opaque organic material layer 248 formed on the second insulating layer 246 is patterned through the third mask process, so that a black matrix 250 is formed over the thin film transistor T, the data line 224, and the gate line 202. The black matrix 250 is formed of an organic material to protect the thin film transistor T.

Figure 6I:
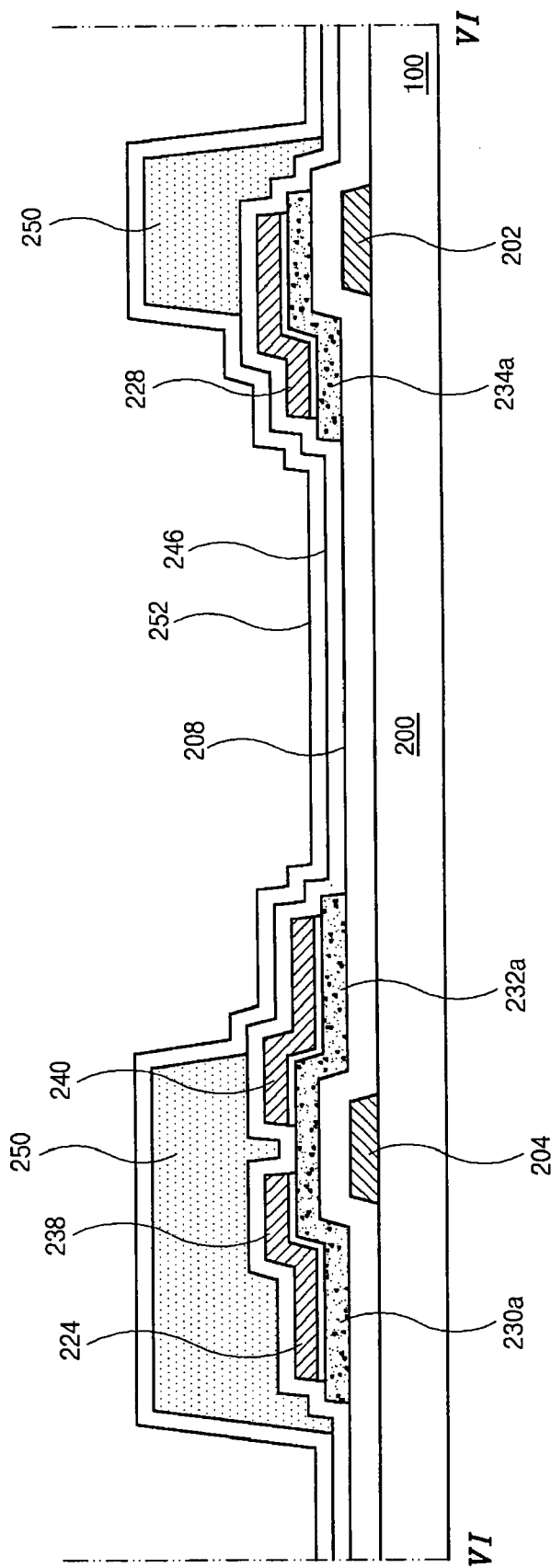

In FIG. 6I, a third insulating layer 252 is formed over the entire surface of the substrate 200 to cover the black matrix 250. The third insulating layer 252 may be formed of an inorganic insulating material, such as silicon nitride ($SiN_x$) or silicon oxide ($SiO_2$), or an organic material insulating material, such as benzocyclobutene (BCB) or acrylic resin.

Figure 6J:
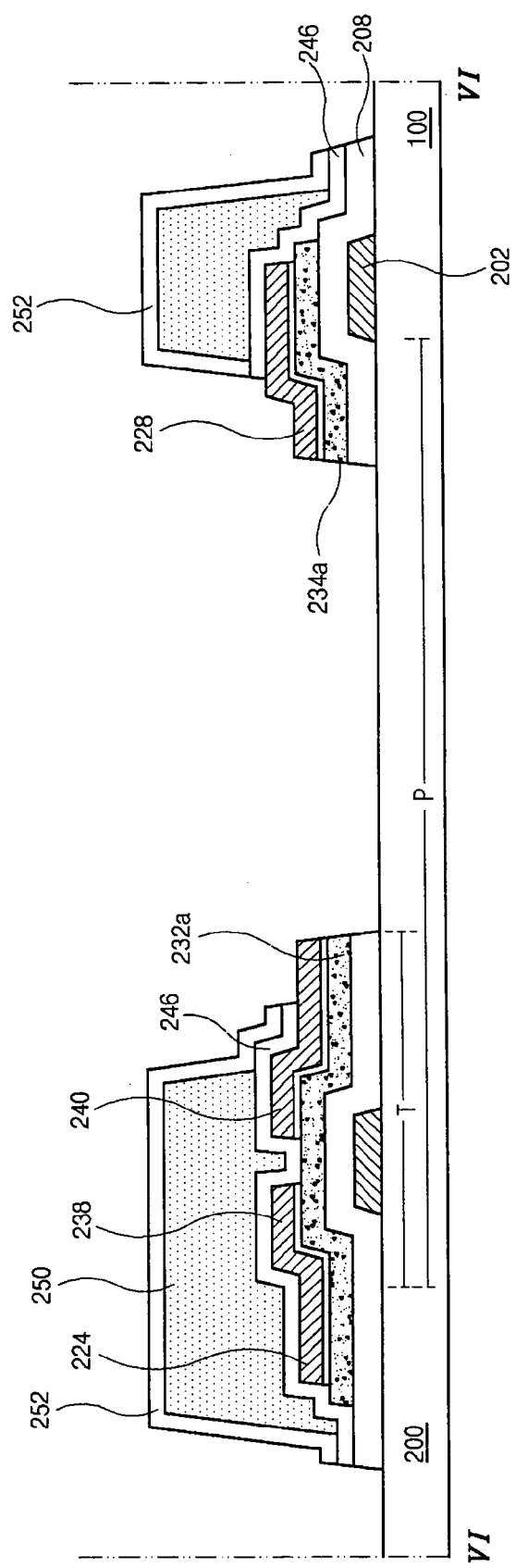

Now in FIG. 6J, the first, second, and third insulating layers 208, 246, and 252 are simultaneously patterned through the fourth mask process. Thus, an end side portion of the drain electrode 240 and an end side portion of the storage metal layer 228 are exposed. Although FIG. 6J shows that the substrate 200 is exposed by patterning the first insulating layer 208, the first insulating layer 208 may remain and only the second and third insulating layers 246 and 252 may be patterned to expose the side portions of the drain electrode 240 and the storage metal layer 228. Furthermore, the remains of the first gate insulating layer 208 on the substrate 200 may control the height of a color filter to be formed in the later processes.

Figure 6K:
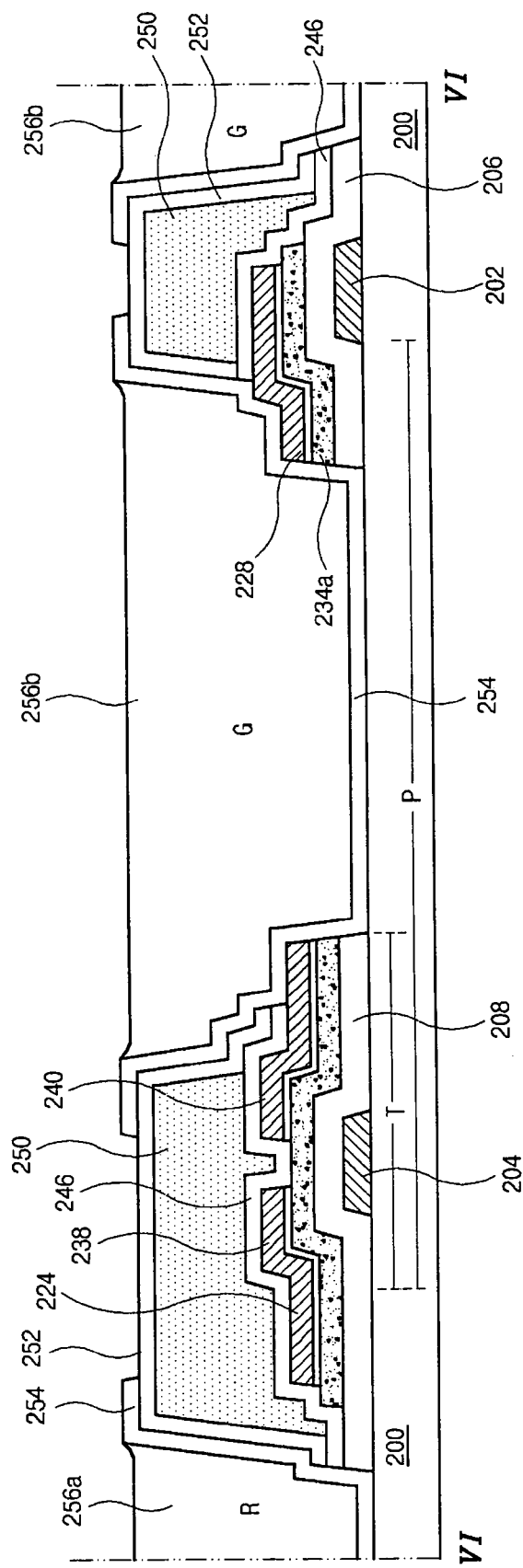

FIG. 6K shows the step of forming a first pixel electrode 254 and color filers 256. A first transparent electrode layer of indium tin oxide (ITO) or indium zinc oxide (IZO) is deposited over the entire surface of the substrate 200 to cover the patterned third insulating layer 252 and to contact the exposed side portions of the drain electrode 240 and storage metal layer 228. Thereafter, the first transparent electrode layer is patterned through the fifth mask process, so that the first pixel electrode 254 is formed in the pixel region P, except for a portion over the gate electrode 204. As shown in FIG. 6K, the first pixel electrode 254 contacts both the side portions of the drain electrode 240 and the storage metal layer 228. After forming the first pixel electrode 254, a color resin is formed on the first pixel electrode 254 and then developed to form color filters 256a, 256b, and 256c having red (R), green (G), and blue (B). As described above, the color filters 256a, 256b, and 256c for displaying the full spectrum of colors are formed in the pixel regions P on the first pixel electrode 254. When developing the color resin, the first pixel electrode 254 may prevent a developer for patterning the color filters from penetrating into the gate insulation layer 208. In the step portions of the gate line 202 and gate electrode 204, the gate insulation layer 208 may be formed with a poor quality and may have defects, such as pinholes and cracks. Therefore, when developing the color filters, the developer for the color filters may penetrate into the gate insulation layer 208 and then deteriorate the gate line 202 and the gate electrode 204. By forming the first pixel electrode 254, such deterioration can be prevented and the process stability can be achieved.

Now in FIG. 6L, a second transparent electrode layer 258 is formed on the color filters 256, on the exposed portions of the first pixel electrode 254, and on the exposed portions of the third insulating layer 252. The second transparent electrode layer 258 is formed of indium tin oxide (ITO) or indium zinc oxide (IZO) similar to the first transparent electrode layer. At this time, the second transparent electrode layer 258 is in an amorphous state. Then, a KrF excimer laser partially irradiates the second transparent electrode layer 258. Especially, the KrF excimer laser irradiates pixel portions of the second transparent electrode layer 258 which corresponds to the pixel regions P, and thus the irradiated portions of the second transparent electrode layer 258 is crystallized. When crystallizing the pixel portions of the second transparent electrode layer 258, a strong UV light from a UV lamp can be used for crystallization instead of the KrF excimer laser.

Figure 6M:
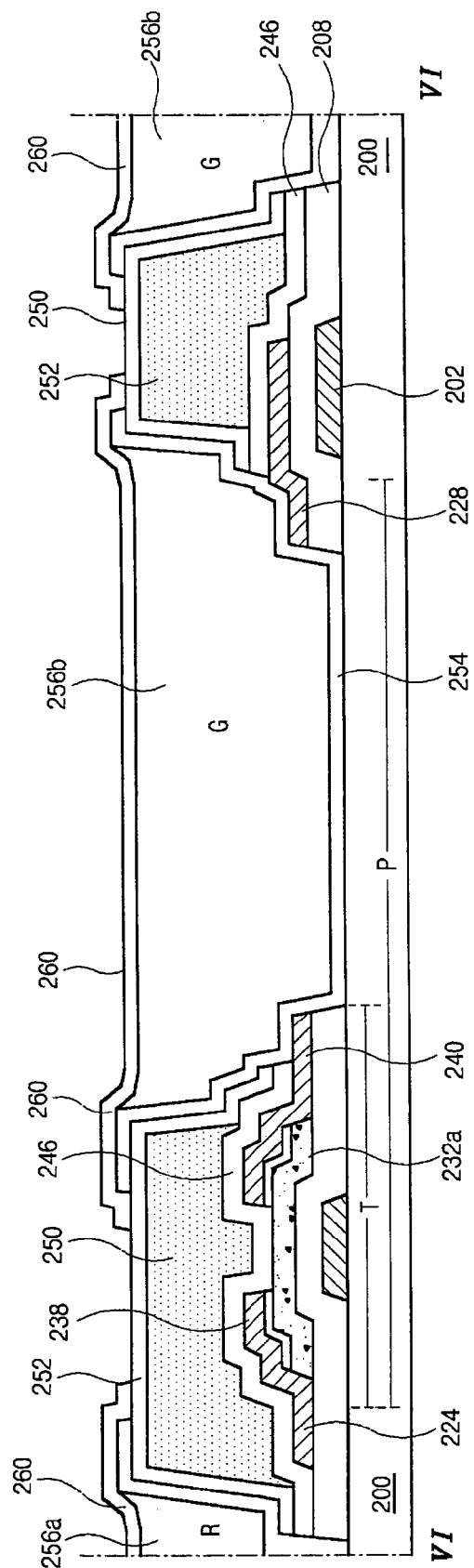

FIG. 6M shows the process step of patterning the second transparent electrode layer 258 to form a double-layered pixel electrode (i.e., often referred to as a sandwich pixel electrode). After the crystallization of the second transparent electrode layer 258, the second transparent electrode layer 258 is etched by oxalic acid [$(COOH)_2 \cdot H_2O + H_2O$], and thus the amorphous portions of the second transparent electrode layer 258 are removed while the crystallized portions of the second transparent electrode layer 132 remains, whereby the crystallized portions of the transparent electrode layer 258 become second pixel electrodes 260. Due to the etch selectivity between the amorphous and crystallized portions of the second transparent electrode layer 258, the second pixel electrode 260 can be formed without any photolithography process. Accordingly, the second pixel electrode 260 contacting the first pixel electrode 254 around the color filter 256 is finally formed. Namely, the sandwich pixel electrode comprised of the first and second pixel electrodes 254 and 260 is formed corresponding to each pixel region P.

As mentioned before, each color filter 256 is interposed between the first and second pixel electrodes 254 and 260 in the present invention. And in the second embodiment of the present invention, the black matrix 250 and the color filters 256 are formed in the lower substrate 200, so that the liquid crystal display device can have a high aperture ratio. Further, since the pixel electrode has a double-layered structure, the process stability is improved during the fabricating process of the array substrate. Furthermore, since no photoresist and no photolithography processes are required when forming the second pixel electrode 260, a developer and/or a stripper will not be applied to the array substrate so that the underlying color filters 130 will not be damaged. Additionally, the process time will be decreased. In the second embodiment of the present invention, the array substrate having a color filter on a thin film transistor (COT) structure is fabricated through the five-mask process. The number of the mask process can be reduced in accordance with the second embodiment of the present invention.

Therefore, the present invention simplifies the fabrication process and reduces the production cost. Furthermore, since the black matrix is formed in the array substrate, it is not required to consider an aligning margin when designing and aligning the lower and upper substrates, thereby increasing an aperture ratio.

It will be apparent to those skilled in the art that various modifications and variations can be made in the method for fabricating the array substrate having a color filter on a thin film transistor structure for the liquid crystal display device of the present invention without departing from the spirit or scope of the inventions. Thus, it is intended that the present invention covers the modifications and variations of this invention provided they come within the scope of the appended claims and their equivalents.

What is claimed is:

1. A method of fabricating a liquid crystal display device, comprising:
    forming a gate line and a data line crossing each other and defining a pixel region;
    forming a thin film transistor at each intersection of the gate and data lines, wherein the thin film transistor includes a gate electrode, an active layer, a source electrode, and a drain electrode;
    forming a first insulating layer to cover the thin film transistor and the data line;
    forming a black matrix on the first insulating layer, except for a portion of the drain electrode;
    forming a second insulating layer on the first insulating layer to cover the black matrix;
    patterning the first and second insulating layers to expose a portion of the drain electrode;
    forming a first transparent electrode layer over a surface of the substrate to cover the patterned second insulating layer and the exposed portion of the drain electrode;
    patterning the first transparent electrode layer to form a pixel electrode in the pixel region, wherein the pixel electrode contacts the exposed portion of the drain electrode;
    forming a color filter on the pixel electrode;
    forming a second transparent electrode layer over a surface of the substrate to cover the color filter and the pixel electrode, wherein the second transparent electrode is in an amorphous state, wherein the second transparent electrode layer is formed of one of indium zinc oxide and indium tin oxide;
    irradiating a light to a portion of the second transparent electrode layer corresponding to the pixel region so as to crystallize the irradiated portion of the second transparent electrode; and
    forming a second pixel electrode in the pixel region by removing a non-crystallized portion of the second transparent electrode layer by applying oxalic acid [$(COOH)_2 \cdot H_2O + H_2O$] to the partially irradiated second transparent electrode layer, wherein the second pixel electrode contacts the first pixel electrode over the black matrix.

2. The method according to claim 1, further comprising forming a gate insulation layer to cover the gate line and the gate electrode.

3. The method according to claim 1, wherein the gate insulation layer is disposed between the active layer and the gate electrode.

4. The method according to claim 1, wherein the thin film transistor comprises an ohmic contact layer between the active layer and the source and drain electrodes.

5. The method according to claim 1, wherein the black matrix is formed of a black resin.

6. The method according to claim 1, wherein the black matrix is formed of an opaque photosensitive organic material.

7. The method according to claim 1, further comprising forming a storage capacitor over a portion of the gate line.

8. The method according to claim 1, wherein forming the storage capacitor comprises forming a storage metal layer over the portion of the gate line, so that the storage capacitor acts as a first electrode of the storage capacitor and the portion of the gate line acts as a second electrode of the storage capacitor.

9. The method according to claim 8, wherein the storage metal layer is electrically connected with the first pixel electrode.

10. The method according to claim 1, wherein the first and second insulating layers are formed of an inorganic material.

11. The method according to claim 10, wherein the inorganic material is formed of one of silicon oxide and silicon nitride.

12. The method according to claim 1, wherein the color filter is formed of a color resin.

13. The method according to claim 1, wherein the light comprises one of a laser and a UV source.

14. The method according to claim 13, wherein the laser is a KrF excimer laser.

15. A method of fabricating a liquid crystal display device, comprising:
 forming a gate line in a first direction and a gate electrode extending from the gate line over a substrate;
 forming an active layer, an ohmic contact layer, a data line, a source electrode, and a drain electrode by using a same mask, wherein the data line and the gate line cross each other over the substrate and define a pixel region, the source electrode extends from the data line, the source and drain electrodes contact the ohmic contact layer, thereby forming a thin film transistor at each intersection of the gate and data lines;
 forming a first insulating layer to cover the thin film transistor and the data line;
 forming a black matrix on the first insulating layer, except for a portion of the drain electrode;
 forming a second insulating layer on the first insulating layer to cover the black matrix;
 patterning the first and second insulating layers to expose a portion of the drain electrode;
 forming a first transparent electrode layer over a surface of the substrate to cover the patterned second insulating layer and the exposed portion of the drain electrode;
 patterning the first transparent electrode layer to form a pixel electrode in the pixel region, wherein the pixel electrode contacts the exposed portion of the drain electrode;
 forming a color filter on the pixel electrode;
 forming a second transparent electrode layer over a surface of the substrate to cover the color filter and the pixel electrode, wherein the second transparent electrode is in an amorphous state, wherein the second transparent electrode layer is formed of one of indium zinc oxide and indium tin oxide;
 irradiating a light to a portion of the second transparent electrode layer corresponding to the pixel region so as to crystallize the irradiated portion of the second transparent electrode; and
 forming a second pixel electrode in the pixel region by removing a non-crystallized portion of the second transparent electrode layer by applying oxalic acid [$(COOH)_2 \cdot H_2O + H_2O$] to the partially irradiated second transparent electrode layer, wherein the second pixel electrode contacts the first pixel electrode around the color filter.

16. The method according to claim 15, wherein the mask comprises a transmitting portion where the light fully passes through, a shielding portion where the light is thoroughly blocked, and a half-transmitting portion where only a half portion of the light passes through.

17. The method according to claim 16, wherein the transmitting portion corresponds to the pixel region, except for a portion for the thin film transistor, the shielding portion corresponds to the data line and the thin film transistor, and the half-transmitting portion corresponds to the gate electrode.

18. The method according to claim 17, wherein the half-transmitting portion is one of a plurality of slits and a semi-transparent film.

19. The method according to claim 17, wherein the active layer is an intrinsic amorphous silicon, and the ohmic contact layer is a doped amorphous silicon.

20. The method according to claim 15, further comprising forming a gate insulation layer to cover the gate line and the gate electrode.

21. The method according to claim 15, wherein a gate insulation layer is disposed between the active layer and the gate electrode.

22. The method according to claim 15, wherein the ohmic contact layer is disposed between the active layer and the source and drain electrodes.

23. The method according to claim 15, wherein the black matrix is formed of a black resin.

24. The method according to claim 15, wherein the black matrix is formed of an opaque photosensitive organic material.

25. The method according to claim 15, further comprising forming a storage capacitor over a portion of the gate line.

26. The method according to claim 15, wherein forming the storage capacitor includes forming a storage metal layer over the portion of the gate line, so that the storage capacitor acts as a first electrode of the storage capacitor and the portion of the gate line acts as a second electrode of the storage capacitor.

27. The method according to claim 26, wherein the storage metal layer is electrically connected with the first pixel electrode.

28. The method according to claim 15, wherein the first and second insulating layers are formed of an inorganic material.

29. The method according to claim 28, wherein the inorganic material is formed of one of silicon oxide and silicon nitride.

30. The method according to claim 15, wherein the color filter is formed of a color resin.

31. The method according to claim 15, wherein the light comprises one of a laser and a UV source.

32. The method according to claim 31, wherein the laser is a KrF excimer laser.

* * * * *